(12) United States Patent
Becker et al.

(10) Patent No.: US 10,843,591 B2
(45) Date of Patent: *Nov. 24, 2020

(54) GEAR ASSEMBLY FOR A SEAT ADJUSTER

(71) Applicant: FISHER & COMPANY, INCORPORATED, St. Clair Shores, MI (US)

(72) Inventors: Burckhard Becker, Solingen (DE); Mircea Napau, Sterling Heights, MI (US); Armin Michel, Wuppertal (DE)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/260,782

(22) Filed: Jan. 29, 2019

(65) Prior Publication Data

US 2019/0152347 A1  May 23, 2019

Related U.S. Application Data

(63) Continuation-in-part of application No. 15/404,550, filed on Jan. 12, 2017, now Pat. No. 10,195,975.

(Continued)

(51) Int. Cl.
*F16H 27/02* (2006.01)
*F16H 29/02* (2006.01)
(Continued)

(52) U.S. Cl.
CPC ......... *B60N 2/0232* (2013.01); *F16H 19/001* (2013.01); *F16H 37/041* (2013.01);
(Continued)

(58) Field of Classification Search
CPC . F16H 1/32; F16H 2001/2881; B60N 2/2252; B60N 2/165; B60N 2/166; B60N 2/1645
See application file for complete search history.

(56) References Cited

U.S. PATENT DOCUMENTS 546,249 A   9/1895  Regan
657,542 A   9/1900  Ingersoll
(Continued)

FOREIGN PATENT DOCUMENTS

CN   101448674 A   6/2009
CN   201350516 Y   11/2009
(Continued)

OTHER PUBLICATIONS

International Search Report and Written Opinion dated Nov. 28, 2016, regarding International Application No. PCT/US2016/048649.

(Continued)

*Primary Examiner* — Jake Cook
(74) *Attorney, Agent, or Firm* — Harness, Dickey & Pierce, P.L.C.

(57) ABSTRACT

A gear assembly for a seat adjuster includes a gear housing, a worm gear, a helical gear meshed with the worm gear, a wobble gear carried on an eccentric lobe of the helical gear, a pinion disc, a first ring gear disposed in the gear housing, a second ring gear disposed in the pinion disc, and a pinion member carrying the helical gear and the pinion disc. The wobble gear includes first and second sets of wobble gear teeth that mesh with the first and second ring gears, respectively. A housing side gear ring disposed in the gear housing defines part of the first ring gear and the gear housing defines another part of the first ring gear. The pinion disc defines the second ring gear.

20 Claims, 12 Drawing Sheets

Related U.S. Application Data

(60) Provisional application No. 62/280,332, filed on Jan. 19, 2016.

(51) Int. Cl.

| | | |
|---|---|---|
| *F16H 29/20* | (2006.01) | |
| *B60N 2/02* | (2006.01) | |
| *F16H 37/04* | (2006.01) | |
| *F16H 19/00* | (2006.01) | |
| *F16H 57/032* | (2012.01) | |
| *F16H 55/06* | (2006.01) | |
| *F16H 57/039* | (2012.01) | |
| *F16H 1/16* | (2006.01) | |
| *F16H 1/32* | (2006.01) | |
| *F16H 55/17* | (2006.01) | |

(52) U.S. Cl.
CPC ........... *F16H 55/06* (2013.01); *F16H 57/032* (2013.01); *F16H 57/039* (2013.01); *B60N 2002/0236* (2013.01); *F16H 1/16* (2013.01); *F16H 1/32* (2013.01); *F16H 2055/176* (2013.01)

(56) References Cited

U.S. PATENT DOCUMENTS

| | | |
|---|---|---|
| 978,371 A | 12/1910 | Harrison |
| 1,192,627 A | 7/1916 | Hatlee |
| 1,694,031 A | 12/1928 | Braren |
| 1,770,035 A | 7/1930 | Heap et al. |
| 2,168,164 A | 8/1939 | Kittredge |
| 2,170,951 A | 8/1939 | Perry |
| 2,250,259 A | 7/1941 | Foote, Jr. |
| 2,475,504 A | 7/1949 | Jackson |
| 2,508,121 A | 5/1950 | McIver |
| 2,609,713 A | 9/1952 | Martin |
| 2,972,910 A | 2/1961 | Menge, Sr. |
| 2,995,226 A | 8/1961 | Gilder |
| 3,013,447 A | 12/1961 | Hils et al. |
| 3,037,400 A | 6/1962 | Sundt |
| 3,144,791 A | 8/1964 | Menge, Sr. |
| 3,319,482 A | 5/1967 | Campbell et al. |
| 3,427,901 A | 2/1969 | Wildhaber |
| 3,451,290 A | 6/1969 | Wildhaber |
| 3,965,773 A | 6/1976 | Bert et al. |
| 4,023,441 A | 5/1977 | Osterwalder |
| 4,228,698 A | 10/1980 | Winiasz |
| 4,269,075 A | 5/1981 | Crist et al. |
| 4,452,102 A | 6/1984 | Shaffer |
| 4,721,337 A | 1/1988 | Tomita |
| 4,884,844 A * | 12/1989 | Kershaw ............... B60N 2/2252 297/362 |
| 4,930,367 A | 6/1990 | Nagasawa |
| 4,967,615 A | 11/1990 | Mills |
| 5,030,184 A | 7/1991 | Rennerfelt |
| 5,099,717 A | 3/1992 | Ochiai et al. |
| 5,222,402 A | 6/1993 | White et al. |
| 5,349,878 A | 9/1994 | White et al. |
| 5,425,683 A | 6/1995 | Bang |
| 5,505,668 A | 4/1996 | Koriakov-Savoysky et al. |
| 5,598,746 A | 2/1997 | Chen |
| 5,701,783 A | 12/1997 | Lin |
| 5,865,506 A | 2/1999 | Sakamoto |
| 6,032,550 A | 3/2000 | Rugh |
| 6,138,974 A | 10/2000 | Okada et al. |
| D437,334 S | 2/2001 | Song |
| 6,260,922 B1 | 7/2001 | Frohnhaus et al. |
| 6,261,199 B1 | 7/2001 | Schlangen |
| 6,548,332 B2 | 4/2003 | Peng et al. |
| 6,742,409 B2 | 6/2004 | Blanchard |
| 7,041,024 B2 | 5/2006 | Becker et al. |
| 7,051,986 B1 | 5/2006 | Taubmann et al. |
| 7,143,513 B2 | 12/2006 | Taubmann et al. |
| 7,198,243 B2 | 4/2007 | Hofschulte et al. |
| 7,313,982 B2 | 1/2008 | Wisner et al. |
| 7,322,257 B2 | 1/2008 | Becker et al. |
| 7,340,974 B2 | 3/2008 | Landskron et al. |
| 7,437,962 B2 | 10/2008 | Taubmann et al. |
| 7,571,666 B2 | 8/2009 | Borbe et al. |
| 8,113,074 B2 | 2/2012 | Wohrle et al. |
| 8,171,823 B2 | 5/2012 | Koga et al. |
| 8,453,529 B2 | 6/2013 | Birker et al. |
| 8,485,489 B2 | 7/2013 | Hofschulte et al. |
| 8,826,756 B2 | 9/2014 | Hoffmann et al. |
| 8,864,231 B2 | 10/2014 | Shimoda et al. |
| 8,904,895 B2 | 12/2014 | Woehrle et al. |
| 9,180,795 B2 | 11/2015 | Flieger et al. |
| 9,205,763 B2 | 12/2015 | Anticuar et al. |
| 9,415,713 B2 | 8/2016 | Line et al. |
| 9,902,295 B2 | 2/2018 | Napau et al. |
| 10,024,392 B2 | 7/2018 | Napau et al. |
| 10,195,975 B2 | 2/2019 | Becker et al. |
| 10,486,554 B2 | 11/2019 | Napau et al. |
| 2004/0206195 A1 | 10/2004 | Landskron et al. |
| 2004/0254041 A1 | 12/2004 | Becker et al. |
| 2005/0082890 A1 | 4/2005 | Taubmann et al. |
| 2005/0116132 A1 | 6/2005 | Sakamaki |
| 2005/0126333 A1 | 6/2005 | Dohles et al. |
| 2005/0146174 A1 | 7/2005 | Maddelein et al. |
| 2005/0253036 A1 | 11/2005 | Li et al. |
| 2005/0269478 A1 | 12/2005 | Woehrle et al. |
| 2006/0084547 A1 | 4/2006 | Dill et al. |
| 2006/0117885 A1 * | 6/2006 | Robson ................ B60T 13/02 74/413 |
| 2006/0213302 A1 | 9/2006 | Hoffmann et al. |
| 2006/0249644 A1 | 11/2006 | Folliot et al. |
| 2007/0029893 A1 | 2/2007 | Schuler et al. |
| 2007/0209857 A1 | 9/2007 | Wolf |
| 2007/0241602 A1 | 10/2007 | Thiel et al. |
| 2008/0261743 A1 | 10/2008 | Junkers |
| 2009/0045661 A1 | 2/2009 | Stoessel et al. |
| 2010/0139425 A1 | 6/2010 | Schulz et al. |
| 2010/0237216 A1 | 9/2010 | Napau et al. |
| 2010/0320352 A1 | 12/2010 | Weber |
| 2011/0079699 A1 | 4/2011 | Tarusawa et al. |
| 2011/0308340 A1 | 12/2011 | Bosecker et al. |
| 2012/0325033 A1 | 12/2012 | Bosecker et al. |
| 2013/0180348 A1 | 7/2013 | Andres et al. |
| 2013/0333496 A1 | 12/2013 | Boutouil et al. |
| 2014/0238188 A1 | 8/2014 | Ito |
| 2015/0020955 A1 | 1/2015 | Hoffmann et al. |
| 2015/0210187 A1 | 7/2015 | Harleb et al. |
| 2015/0283924 A1 | 10/2015 | Boutouil et al. |
| 2015/0360587 A1 | 12/2015 | Hoffmann et al. |
| 2016/0257223 A1 | 9/2016 | Markel et al. |
| 2018/0065507 A1 | 3/2018 | Napau et al. |
| 2019/0202322 A1 | 7/2019 | Napau et al. |
| 2020/0215936 A1 | 7/2020 | Teer et al. |

FOREIGN PATENT DOCUMENTS

| | | |
|---|---|---|
| CN | 101528502 B | 8/2012 |
| CN | 104520140 A | 4/2015 |
| CN | 104802666 A | 7/2015 |
| CN | 105270212 A | 1/2016 |
| DE | 1755740 A1 | 1/1972 |
| DE | 3107455 A1 | 10/1982 |
| DE | 19815283 A1 | 10/1999 |
| DE | 10250994 A1 | 8/2003 |
| DE | 10203983 B4 | 5/2004 |
| DE | 10327103 A1 | 12/2004 |
| DE | 102004013543 A1 | 10/2005 |
| DE | 102005044467 B3 | 3/2007 |
| DE | 202008016335 U1 | 3/2009 |
| DE | 102009006815 A1 | 8/2009 |
| DE | 10362326 B4 | 2/2014 |
| EP | 0450324 A2 | 10/1991 |
| EP | 0617213 A1 | 9/1994 |
| EP | 0848672 B1 | 12/1999 |
| EP | 0992711 A2 | 4/2000 |
| EP | 1068093 A1 | 1/2001 |
| EP | 1026027 B1 | 3/2004 |
| EP | 1442923 A2 | 8/2004 |

(56) References Cited

FOREIGN PATENT DOCUMENTS

| | | |
|---|---|---|
| FR | 679410 A | 4/1930 |
| FR | 2517018 A3 | 5/1983 |
| FR | 2872747 A1 | 1/2006 |
| FR | 2882975 A1 | 9/2006 |
| GB | 2404704 A | 2/2005 |
| JP | S62184939 A | 8/1987 |
| JP | H088197988 A | 8/1996 |
| JP | 2010112553 A | 5/2010 |
| JP | 2015134513 A | 7/2015 |
| JP | 2018203208 A | 12/2018 |
| KR | 101470180 B1 | 12/2014 |
| KR | 101501384 B1 | 3/2015 |
| KR | 101518647 B1 | 5/2015 |
| KR | 101708126 B1 | 2/2017 |
| WO | WO-8606036 A1 | 10/1986 |
| WO | WO-9709192 A1 | 3/1997 |
| WO | WO-03074209 A2 | 9/2003 |
| WO | WO-2009092946 A2 | 7/2009 |
| WO | WO-2010/116125 A1 | 10/2010 |
| WO | WO-2011098161 A1 | 8/2011 |
| WO | WO-2011/137989 A1 | 11/2011 |
| WO | WO-2012/150050 A1 | 11/2012 |
| WO | WO-2013/010888 A2 | 1/2013 |
| WO | WO-2015161714 A1 | 10/2015 |
| WO | WO-2018221977 A1 | 12/2018 |

OTHER PUBLICATIONS

International Search Report for PCT/US2016/048634; dated Dec. 21, 2016; 3 pp.

International Search Report regarding International Application No. PCT/US2019/021870, dated Jun. 25, 2019.

Written Opinion of the International Searching Authority regarding International Application No. PCT/US2019/021870, dated Jun. 25, 2019.

U.S. Appl. No. 16/299,384, filed Mar. 12, 2019, Mircea Nagau et al.

U.S. Appl. No. 16/737,991, filed Jan. 9, 2020, Antal Teer et al.

U.S. Appl. No. 16/787,420, filed Feb. 11, 2020, Mircea Napau et al.

Dicker Jr. et al., "Worms and Worm Gears." Theory of Machines and Mechanisms, 3rd ed., Oxford University Press, 2003, pp. 306-310.

International Search Report regarding International Application No. PCT/US2020/012857, dated Apr. 29, 2020.

Written Opinion of the International Searching Authority regarding International Application No. PCT/US2020/012857, dated Apr. 29, 2020.

Office Action regarding German Patent Application No. 102020200205.3, dated Aug. 20, 2020. Partial translation provided by Bardehle Pagenberg Partnerschaft mbB.

\* cited by examiner

GEAR ASSEMBLY FOR A SEAT ADJUSTER

CROSS-REFERENCE TO RELATED APPLICATIONS

This application is a continuation-in-part of U.S. patent application Ser. No. 15/404,550, filed on Jan. 12, 2017, which claims the benefit of U.S. Provisional Application No. 62/280,332, filed on Jan. 19, 2016. The entire disclosures of the above applications are incorporated herein by reference.

FIELD

The subject disclosure relates to gear assemblies for seat adjusters and more particularly to a motor-driven gear assembly for a seat adjuster in a vehicle.

BACKGROUND

This section provides background information related to the present disclosure and is not necessarily prior art.

Vehicles such as automobiles are commonly equipped with seat adjusters that raise and lower the driver and passenger seats. Such seat adjusters may be manually operated or power operated. Manually operated seat adjusters commonly employ a knob that is manually rotated by a vehicle occupant to raise and lower the seat. Other versions of manually operated seat adjusters employ a lever that is pushed or pulled by the vehicle occupant to raise and lower the seat. Power operated seat adjusters are typically driven by an electric motor that is actuated by one or more occupant controlled switches. Regardless of whether the seat adjuster is manually operated or power operated, the seat is typically raised and lowered by rotation of a pinion member or shaft that is meshingly engaged with a sector gear. The sector gear has a wedge-like shape and can be thought of as a slice or portion of a larger circular gear. For example and without limitation, the sector gear may have a limited radial extent of 45 degrees or less. The sector gear is pivotally supported on the vehicle and is pivotally coupled to a frame of the seat adjuster. Rotation of the pinion member in one rotational direction causes the sector gear to pivot in a downward direction, which drives the frame of the seat adjuster up. Rotation of the pinion member in an opposite rotational direction causes the sector gear to pivot in an upward direction, which lowers the frame of the seat adjuster. The seat of the vehicle is attached to and supported on the frame of the seat adjuster such that the seat moves up and down with the frame of the seat adjuster.

When the vehicle occupant is seated, there is a large amount of force placed on the frame of the seat adjuster and thus the sector gear. Accordingly, a gear assembly with a high gear reduction is typically used to drive rotation of the pinion member. Such gear assemblies typically include several metal gears that are disposed in meshing engagement with one another. One drawback to existing gear assemblies is that the metal gears make noise when the seat is raised and lowered. Gear related noise is a nuisance to vehicle occupants and is perceived as originating from a faulty or poor quality component. This problem results in numerous service and repair requests.

Some of the most important requirements for automotive seat adjusters include: the range of reduction ratio, the range of output torque, size, weight, efficiency, the level of noise produced by the automotive seat adjuster, shock load capability, cost, durability, and the amount of backlash. For some applications, such as those used in adjusting and maintaining the adjusted position of a vehicle seat, a special requirement called anti-back drive capability is also required. Anti-back drive capability may also be referred to as "non-back drive capability," "self-locking capability," or "anti-regression capability." Gear drives transfer the high speed and low torque rotation of an electric motor input shaft to low speed and high torque rotation of an output shaft, in either, a clockwise (CW) or a counter-clockwise (CCW) direction of rotation. For gear drives with anti-back drive capability, any attempt to transfer torque from the output shaft back to the input shaft by applying an external load (e.g. occupant weight or external reaction forces in the case of a crash accident, etc.) to the output shaft is prevented. This protects against damage to the electric motor and ensures that the vehicle seat maintains its position when the electric motor is not energized. Back drive can also occur, at a much slower rate, as gravity, coupled with road vibration, tends to slowly back drive the seat mechanism downward over time.

SUMMARY

This section provides a general summary of the disclosure, and is not a comprehensive disclosure of its full scope or all of its features.

A gear assembly for a seat adjuster is disclosed herein that exhibits quieter operation without compromising durability and performance. The gear assembly generally includes a gear housing, a worm gear disposed on a rotatable shaft, a helical gear disposed in meshing engagement with the worm gear, a wobble gear, and a pinion member that carries the helical gear. The gear housing includes a gear cavity and a worm gear receptacle that opens into the gear cavity. The worm gear is disposed within the worm gear receptacle and the pinion member extends into the gear cavity of the gear housing. The pinion member includes a pinion disc, is rotatable within the gear cavity, and has an axis of rotation. The helical gear is disposed within the gear cavity of the gear housing and includes an eccentric lobe that projects longitudinally. The wobble gear is carried on the eccentric lobe of the helical gear and is disposed within the gear cavity of the gear housing. The wobble gear includes a first set of wobble gear teeth and a second set of wobble gear teeth. The first and second sets of wobble gear teeth are arranged in a side-by-side relationship and are rotatably coupled such that the first set of wobble gear teeth rotate with the second set of wobble gear teeth.

A first ring gear is disposed within the gear cavity of the gear housing. The first ring gear is disposed in meshing engagement with the first set of wobble gear teeth and is fixed with the gear housing. The first ring gear includes a first set of ring gear teeth that have a first ring gear tooth width. The first ring gear is larger than the wobble gear such that the wobble gear moves in an orbital path within the first ring gear when the helical gear rotates. The pinion disc includes a gear pocket that faces the helical gear and the wobble gear. The gear pocket of the pinion disc includes a second ring gear that is meshingly engaged with the second set of wobble gear teeth. The second ring gear is fixed with the pinion disc such that the second ring gear rotates with the pinion disc relative to the gear housing.

A housing side gear ring is disposed within the gear cavity of the gear housing. The housing side gear ring is fixed to the gear housing and defines a portion of the first ring gear where part of the first ring gear tooth width is defined by the housing side gear ring and another part of the first ring gear tooth width is defined by the gear housing. The housing side gear ring is made of a material that is harder than the gear housing. Advantageously, the softer material of the gear housing makes the gear assembly quieter during operation and reduces play between the first ring gear and the first set of wobble gear teeth. At the same time, the harder material of the housing side gear ring prevents damage, excessive wear, and deformation of the first set of ring gear teeth due to the torque the wobble gear applies to the first ring gear. The gear assembly also prevents back drive from occurring.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
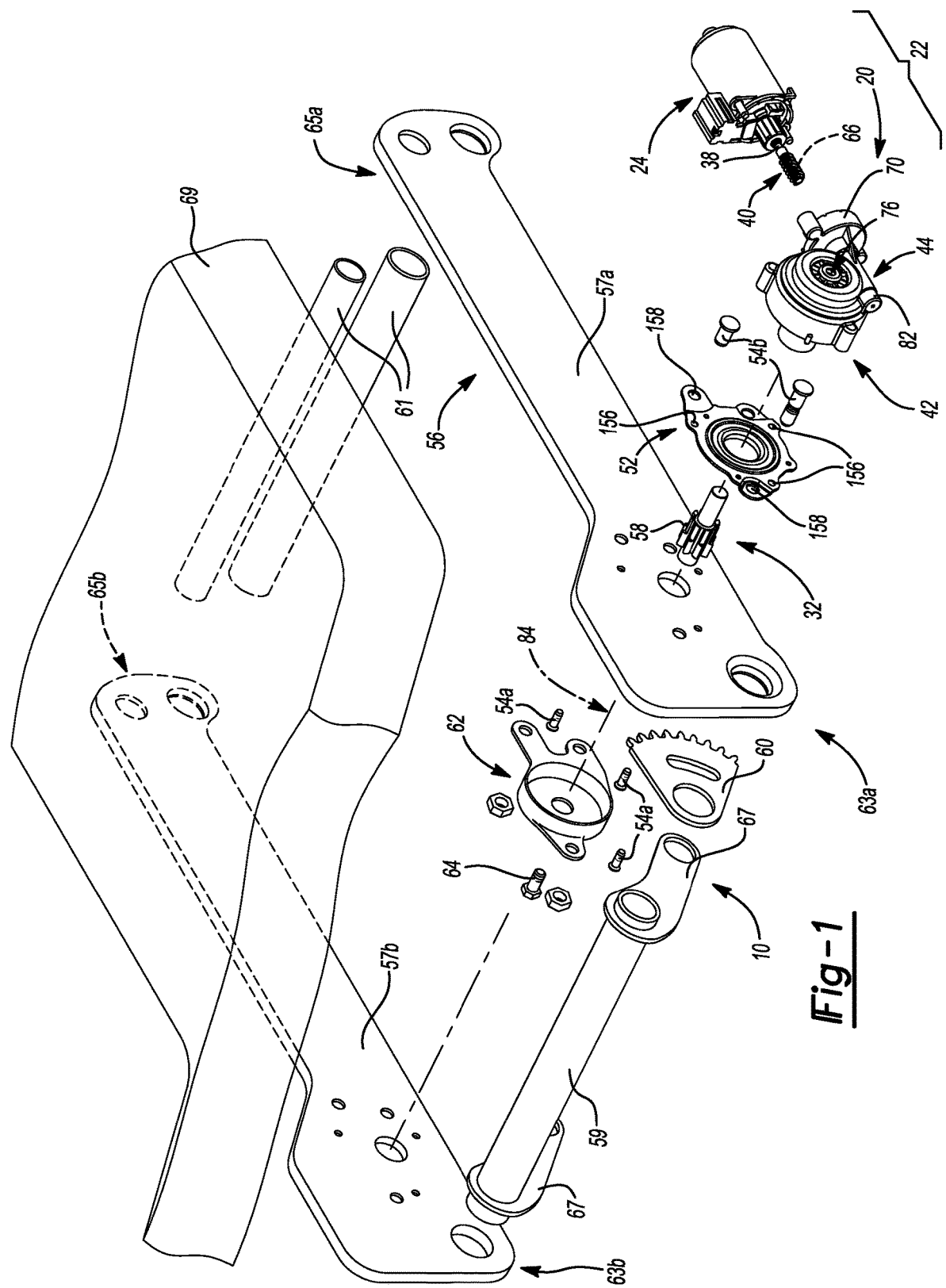
FIG. 1 is a perspective exploded view of an exemplary automotive seat assembly including a seat adjuster and a gear assembly constructed in accordance with the present disclosure, where the automotive seat assembly is illustrated in a raised position.

Referring to the Figures, wherein like numerals indicate corresponding parts throughout the several views, an automotive seat assembly 10 is illustrated, where the automotive seat assembly 10 includes a gear assembly 20 and a seat adjuster 22.

Example embodiments are provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known component structures, well-known assemblies, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the component or assembly in use or operation in addition to the orientation depicted in the figures. For example, if the component or assembly in the figures is turned over, elements described as "below" or "beneath" other elements or features would then be oriented "above" the other elements or features. Thus, the example term "below" can encompass both an orientation of above and below. The components and assemblies described herein may be otherwise oriented (rotated 90 degrees or at other orientations) and the spatially relative descriptors used herein interpreted accordingly.

Figure 2:
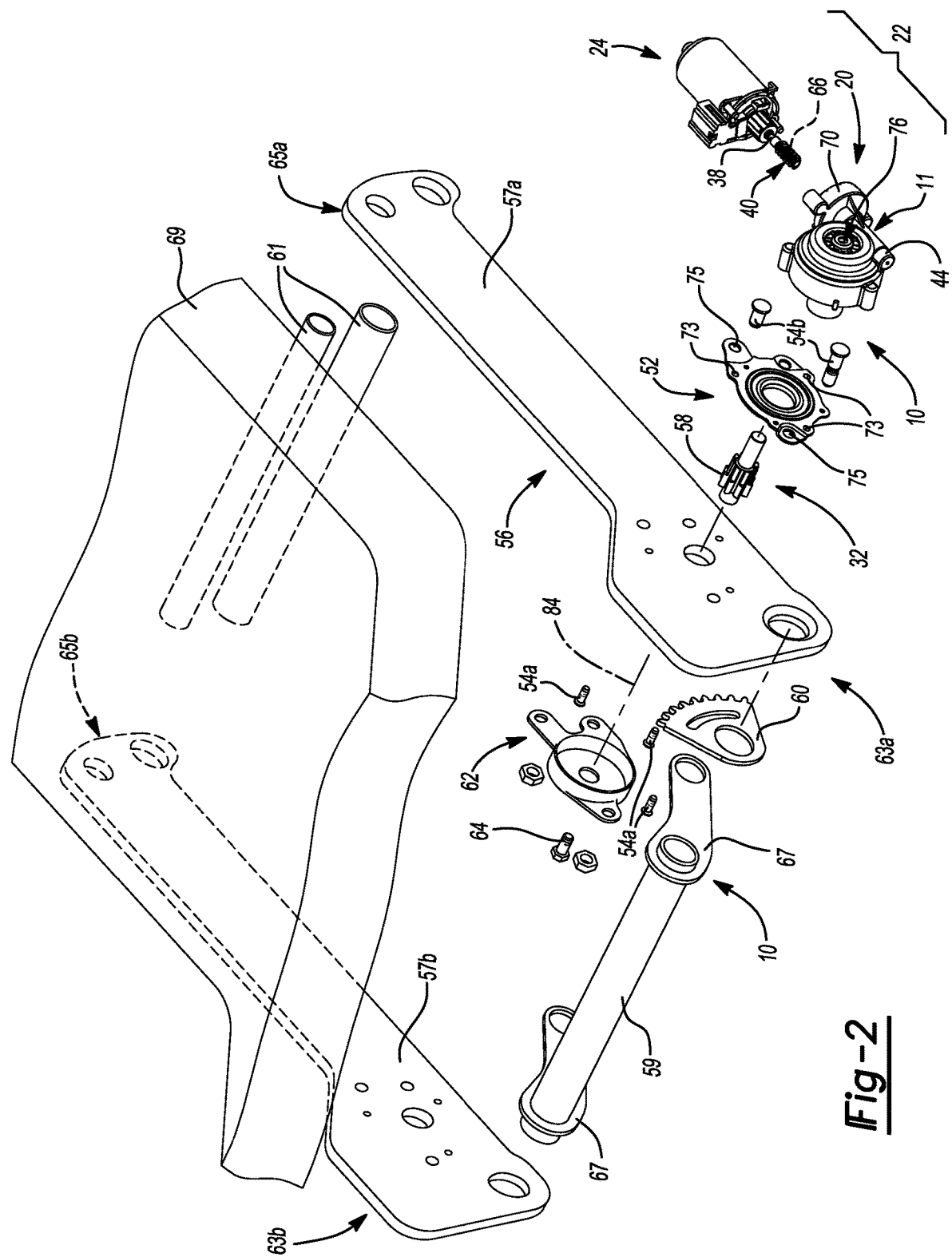
FIG. 2 is a perspective exploded view of the exemplary automotive seat assembly illustrated in FIG. 1, where the automotive seat assembly is illustrated in a lowered position relative to the raised position shown in FIG. 1.

With reference to FIGS. 1 and 2, the seat adjuster 22 is shown in combination with the automotive seat assembly 10. The seat adjuster 22 includes an actuator 24 that includes a rotatable shaft 38 and a worm 40 that rotates with the rotatable shaft 38. The actuator 24 is mounted to a gear housing 42 of the gear assembly 20. The rotatable shaft 38 of the actuator 24 is received within a worm receptacle 44 of the gear housing 42. The gear housing 42 is connected to a gear housing bracket 52 with a plurality of fasteners 54a. The gear housing bracket 52 attaches to a frame 56 of the automotive seat assembly 10 with fasteners 54b. The frame 56 includes two side plates 57a, 57b that are spaced apart from one another. The gear housing bracket 52 holds the gear assembly 20 and thus supports the gear assembly 20 and the actuator 24 on one of the side plates 57a of the frame 56 of the automotive seat assembly 10.

The frame 56 further includes a rear cross-member 59 and one or more front cross-members 61. The two side plates 57a, 57b extend between a pair of rearward ends 63a, 63b and a pair of forward ends 65a, 65b. The rear cross-member 59 extends across the frame 56 between the pair of rearward ends 63a, 63b of the two side plates 57a, 57b and the front cross-members 61 extend across the frame 56 between the pair of forward ends 65a, 65b of the two side plates 57a, 57b. The pair of forward ends 65a, 65b of the two side plates 57a, 57b are designed to be pivotally connected to a vehicle floor (not shown). The rear cross-member 59 of the frame 56 is pivotally connected to the pair of rearward ends 63a, 63b of the frame 56 and includes one or more links 67 that are rotatably fixed with the rear cross-member 59. The links 67 are designed to be pivotally connected to the vehicle floor. The gear assembly 20 includes a pinion member 32 with a splined portion 58 that meshes with a sector gear 60 of the seat adjuster 22. The sector gear 60 is rotatably fixed with the rear cross-member 59. Therefore, it should be appreciated that rotation of the pinion member 32 causes the sector gear 60 to pivot either up or down, which raises and lowers the frame 56 of the automotive seat assembly 10 relative to the vehicle floor between a raised position (FIG. 1) where the pair of rearward ends 63a, 63b of the frame 56 are spaced away from the vehicle floor and a lowered position (FIG. 2) where the pair of rearward ends 63a, 63b of the frame 65 are brought closer to the vehicle floor. The automotive seat assembly 10 includes a vehicle seat 69 that is mounted to the frame 56 and that moves with the frame 56 in response to rotation of the pinion member 32.

Figure 3:
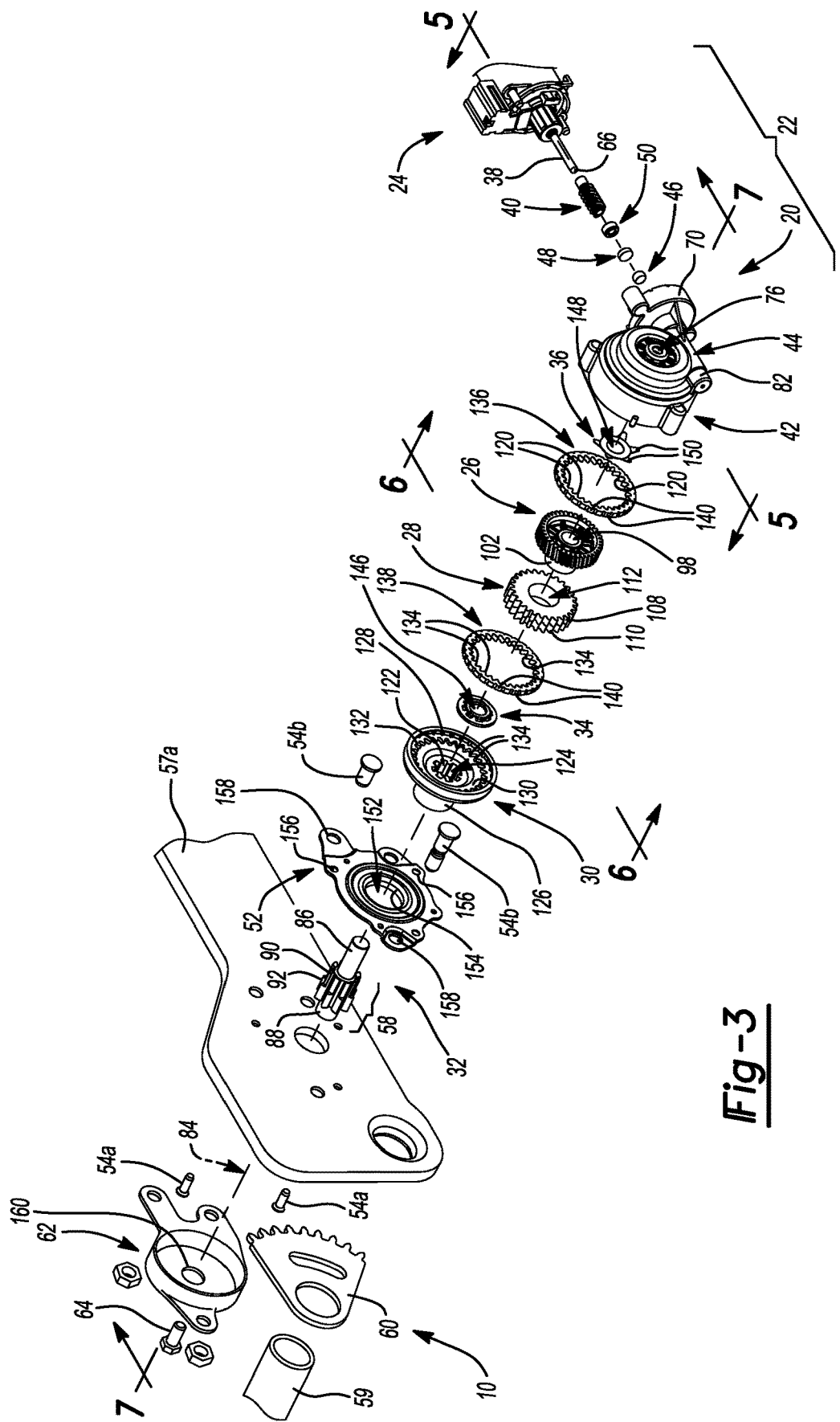
FIG. 3 is an exploded front perspective view of the exemplary gear seat adjuster shown in FIG. 1, where the exemplary seat adjuster has been constructed in accordance with the subject disclosure and includes a gear assembly having a gear housing, an actuator, a pinion member, a helical gear, a wobble gear, and a pinion disc.

With reference to FIG. 3, the gear assembly 20 further includes a helical gear 26, a wobble gear 28, a pinion disc 30. The pinion member 32 carries (i.e. supports) the helical gear 26 and the pinion disc 30. The pinion disc 30 is held in place on the pinion member 32 by a disc retainer 34 and the helical gear 26 is held in place on the pinion member 32 by a lock washer 36. The worm gear 40, the helical gear 26, the wobble gear 28, the disc retainer 34, the lock washer 36, and at least part of the pinion disc 30 are housed inside the gear housing 42. The rotatable shaft 38 is supported within the worm gear receptacle 44 of the gear housing 42 by the combination of a cushion 46, a spacer 48, and a sleeve bearing 50 that are all disposed within the worm gear receptacle 44 of the gear housing 42. The seat adjuster 22 also includes a crash bracket 62. The crash bracket 62 is mounted to the frame 56 of the seat adjuster 22. A bolt 64 extends through the crash bracket 62 and into the pinion member 32. The bolt 64 supports the pinion member 32 while still permitting the pinion member 32 to rotate relative to the crash bracket 62 and the frame 56 of the seat adjuster 22.

The actuator 24 in the illustrated example is an electric motor; however, it should be appreciated that the actuator 24 may take a variety of different forms without departing from the scope of the subject disclosure. By way of example and without limitation, the actuator 24 could be pneumatic, a manually operated knob, or a manually operated lever. In operation, the actuator 24 drives rotation of the rotatable shaft 38, which in turn drives rotation of the worm gear 40. The rotatable shaft 38 may be made of a variety of different materials, including without limitation, a metallic material. The rotatable shaft 38 generally extends away from the actuator 24 to a distal end 66. The worm gear 40 is rotatably fixed with the rotatable shaft 38 of the actuator 24 meaning that the worm gear 40 rotates with the rotatable shaft 38. While the worm gear 40 may be positioned on the rotatable shaft 38 at a variety of different locations, by way of example and without limitation, the worm gear 40 may be positioned at or near the distal end 66 of the rotatable shaft 38. The worm gear 40 may be integral with the rotatable shaft 38 of the actuator 24, or alternatively, the worm gear 40 may be a separate component that is mounted on or otherwise coupled to the rotatable shaft 38. The worm gear 40 has one or more screw-like teeth that wrap around the rotatable shaft 38 in a spiraling fashion.

Figure 4:
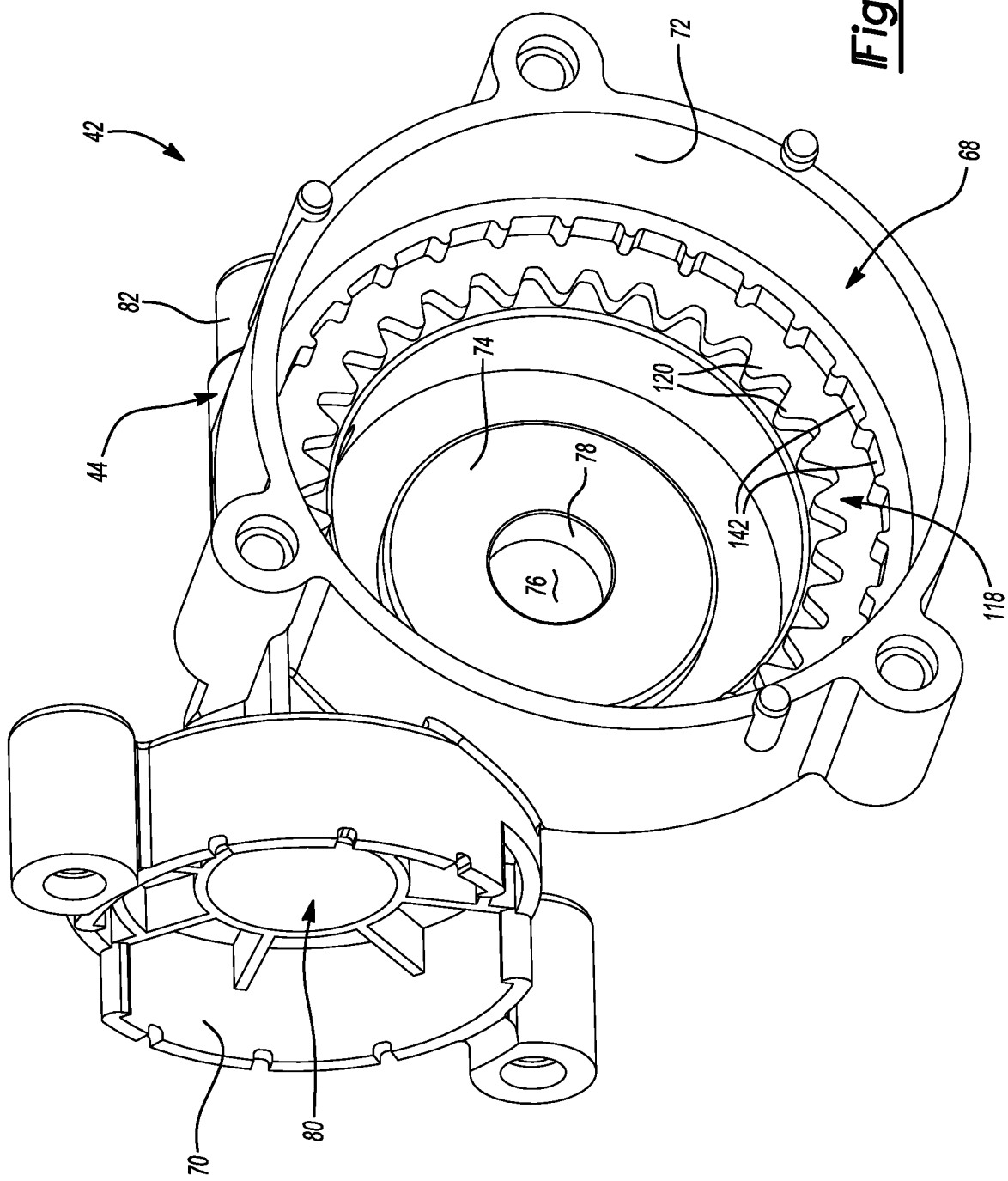
FIG. 4 is a rear perspective view of the gear housing of the exemplary gear assembly shown in FIG. 3.

With additional reference to FIG. 4, the gear housing 42 includes a gear cavity 68 and an actuator attachment 70 that couples to the actuator 24. In other words, the actuator 24 attaches to and is held in place on the gear housing 42 at the actuator attachment 70. The gear cavity 68 that has an open side 72 and an opposing side 74. The opposing side 74 of the gear cavity 68 is at least partially enclosed. Optionally, a hole 76 disposed at the opposing side 74 of the gear cavity 68 extends completely through the gear housing 42. The hole 76 in the gear housing 42 may be circular in shape and is defined by a first bearing surface 78. Although other shapes may be used, the gear housing 42 has a generally circular shape. In the example illustrated, the gear housing 42 is made of a polymeric material. The worm gear receptacle 44 of the gear housing 42 opens into the gear cavity 68. The worm gear receptacle 44 is tangential to the gear cavity 68 and extends from an opening 80 at the actuator attachment 70 to a closed end 82.

Figure 5:
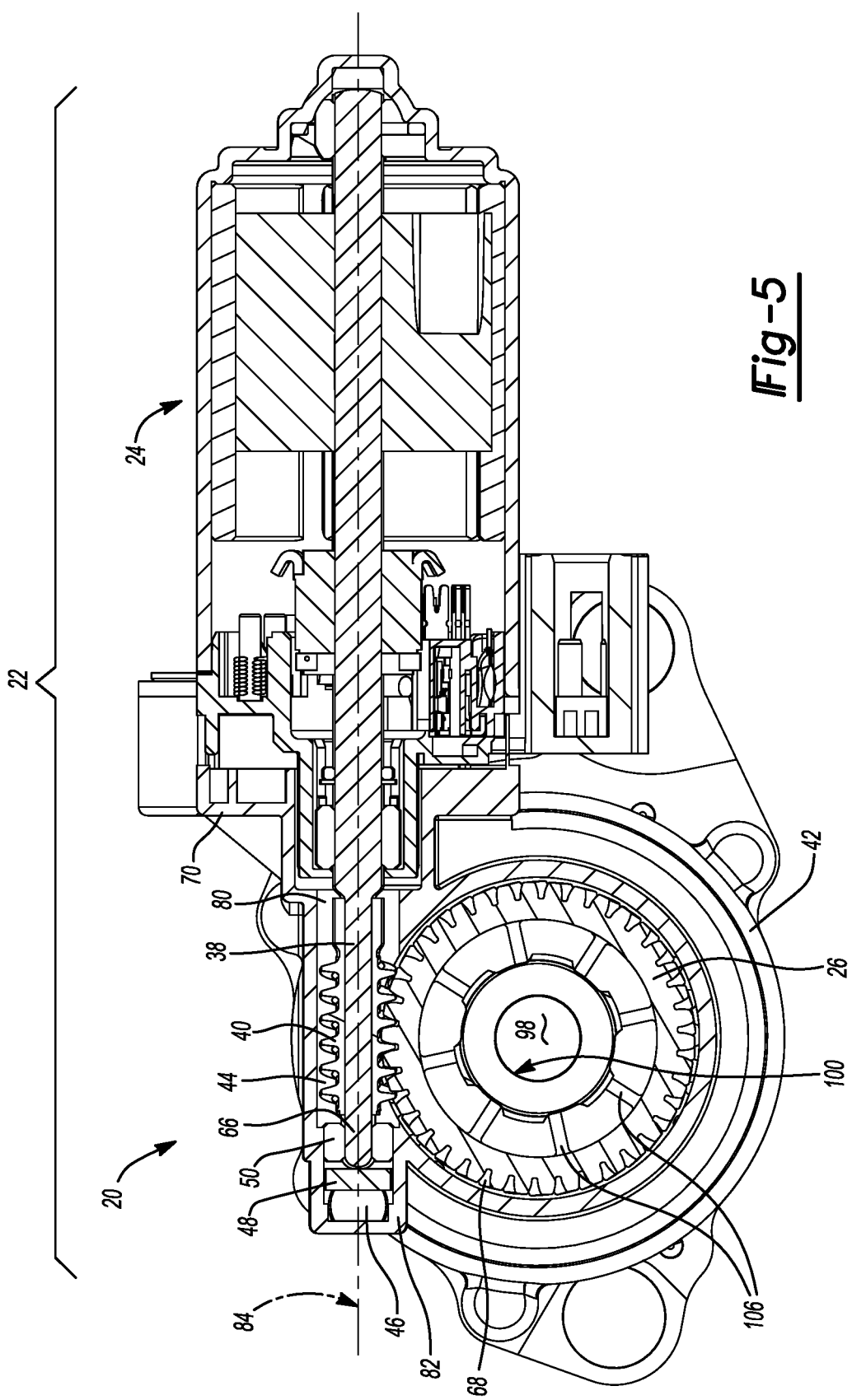
FIG. 5 is a front cross-sectional view of the exemplary seat adjuster and gear assembly shown in FIG. 3 taken along line 5-5 in FIG. 3.

With additional reference to FIG. 5, the worm gear 40 and the distal end 66 of the rotatable shaft 38 are disposed within the worm gear receptacle 44. The position of the worm gear 40 and/or the distal end 66 of the rotatable shaft 38 may vary; however, in the example illustrated, both the worm gear 40 and the distal end 66 of the rotatable shaft 38 are disposed in the closed end 82 of the worm gear receptacle 44. While other shapes may be used, the worm gear receptacle 44 generally has a cylindrical shape. The closed end 82 of the worm gear receptacle 44 receives the cushion 46, which may be fixed to the gear housing 42. The cushion 46 has a cylindrical shape and is made of a resilient material such as rubber. The closed end 82 of the worm gear receptacle 44 also receives the spacer 48. The spacer 48 is positioned axially between the cushion 46 and the distal end 66 of the rotatable shaft 38. The spacer 48 also has a cylindrical shape and is made of a metallic material. The distal end 66 of the rotatable shaft 38 contacts the spacer 48 in an abutting relationship such that axial loads experienced by the worm gear 40 and the rotatable shaft 38 are transferred to the spacer 48. The spacer 48 is rotatable within the closed end 82 of the worm gear receptacle 44 to minimize wear between the distal end 66 of the rotatable shaft 38 and the spacer 48. The worm gear receptacle 44 also receives the sleeve bearing 50, which is positioned axially between the worm gear 40 and the spacer 48. The sleeve bearing 50 extends annularly about the rotatable shaft 38 and supports the rotatable shaft 38 within the worm gear receptacle 44.

Referring to FIGS. 3-5, the pinion member 32 of the gear assembly 20 extends into the gear cavity 68 of the gear housing 42. It should be appreciated that the pinion member 32 is rotatable within the gear cavity 68 and has an axis of rotation 84 that is coaxially arranged with the hole 76 in the gear housing 42. It should be understood that the term "longitudinally" as used herein means movement in a direction that is parallel to or along the axis of rotation 84 of the pinion member 32. The pinion member 32 may generally have a first shaft segment 86 and a second shaft segment 88. The splined portion 58 of the pinion member 32 is disposed between the first and second shaft segments 86, 88 of the pinion member 32. Although the pinion member 32 may be made of a variety of different materials, by way of non-limiting example, the pinion member 32 may be made of a metallic material. The first shaft segment 86 of the pinion member 32 extends through the hole 76 in the gear housing 42 such that the pinion member 32 is supported at one end by the first bearing surface 78 of the gear housing 42. The splined portion 58 of the pinion member 32 may optionally include a first series of splines 90 and a second series of splines 92. The first series of splines 90 extend circumferentially about the pinion member 32 adjacent the first shaft segment 86 and the second series of splines 92 extend circumferentially about the pinion member 32 adjacent the second shaft segment 88. In other words, the first series of splines 90 and the second series of splines 92 are arranged in a side-by-side relationship on the pinion member 32. The first series of splines 90 may have a first spline height 94 (FIG. 7) and the second series of splines 92 may have a second spline height 96 (FIG. 7) that is greater than the first spline height 94.

As noted above, the helical gear 26 is carried on the pinion member 32. By way of non-limiting example, the helical gear 26 may be carried on the first shaft segment 86 of the pinion member 32. The helical gear 26 is disposed within the gear cavity 68 of the gear housing 42 and is arranged in meshing engagement with the worm gear 40. In operation, rotation of the worm gear 40 drives rotation of the helical gear 26, which is free to rotate on and relative to the pinion member 32. The helical gear 26 includes a central bore 98 that is defined by a second bearing surface 100. The central bore 98 is circular in shape and is co-axially arranged with the axis of rotation 84 of the pinion member 32. The first shaft segment 86 of the pinion member 32 extends through the central bore 98 of the helical gear 26 such that the helical gear 26 is supported by and is rotatable relative to the pinion member 32.

Figure 6:
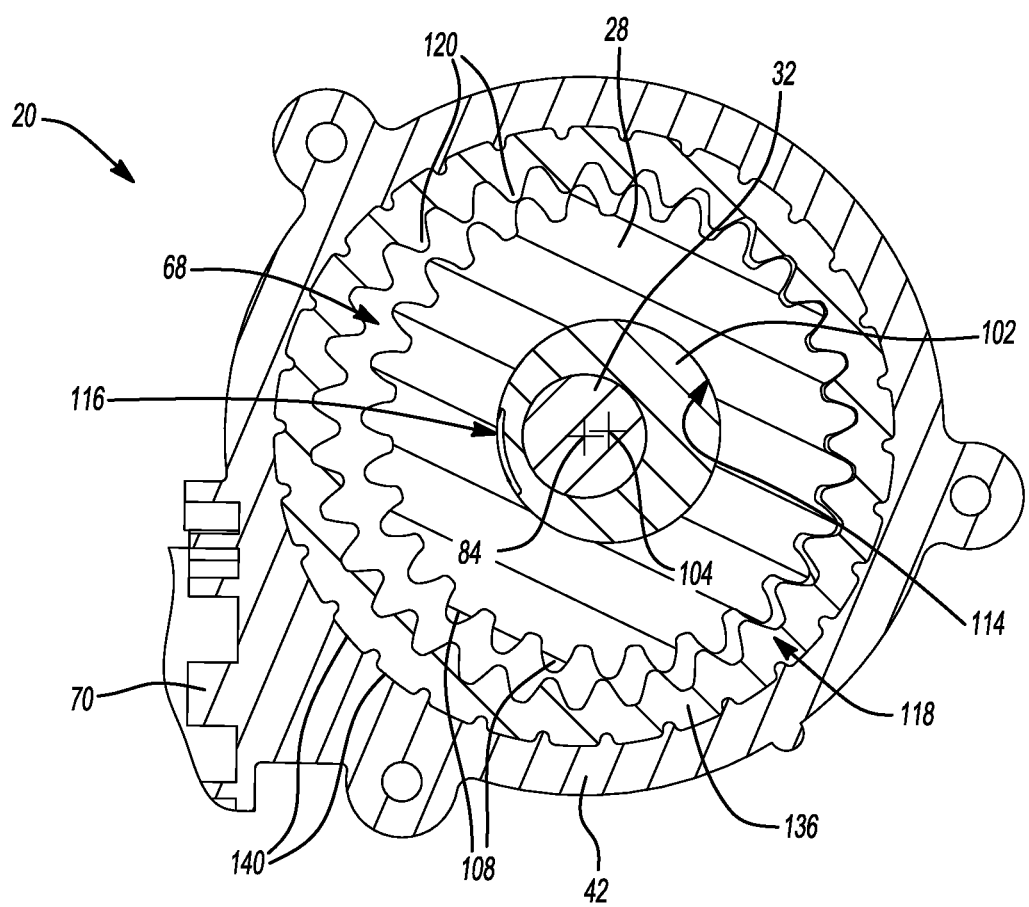
FIG. 6 is a rear cross-sectional view of the exemplary gear assembly shown in FIG. 3 taken along line 6-6 in FIG. 3.

With additional reference to FIG. 6, the helical gear 26 includes an eccentric lobe 102 that projects longitudinally toward the splined portion 58 of the pinion member 32. The eccentric lobe 102 is eccentrically arranged relative to the central bore 98 and has an axis of eccentricity 104 that runs parallel to and is spaced from the axis of rotation 84 of the pinion member 32. As best seen in FIG. 5, the helical gear 26 may optionally include a plurality of spokes 106 that extend radially outwardly away from the central bore 98. The plurality of spokes 106 reduce the amount of material used in the helical gear 26 for weight and cost savings. The helical gear 26 may be made of a variety of different materials, including without limitation, an engineering thermoplastic such as polyoxymethylene (i.e. Delrin®). It should be understood that as opposed to a spur-gear arrangement where the gear teeth are cut at an orientation that is parallel to the axis of rotation 84 of the pinion member 32, the gear teeth of the helical gear 26 are cut at an orientation that not parallel to the axis of rotation 84 of the pinion member 32 (i.e. are cut on an angle).

With reference to FIGS. 3-6, the wobble gear 28 is disposed within the gear cavity 68 of the gear housing 42 and is carried on the eccentric lobe 102 of the helical gear 26. In the example illustrated, the wobble gear 28 is made of a metallic material. In operation, rotation of the helical gear 26 drives rotation of the wobble gear 28 in an eccentric, wobbling orbit (i.e. path). It should be appreciated that the wobble gear 28 remains free to rotate on and relative to the eccentric lobe 102 of the helical gear 26. The wobble gear 28 includes a first set of wobble gear teeth 108 and a second set of wobble gear teeth 110 that are arranged in a side-by-side relationship on the wobble gear 28. The first and second set of wobble gear teeth 108, 110 are rotatably coupled such that the first set of wobble gear teeth 108 rotate with the second set of wobble gear teeth 110. The first set of wobble gear teeth 108 and the second set of wobble gear teeth 110 have a spur gear arrangement, meaning that the first set of wobble gear teeth 108 and the second set of wobble gear teeth 110 are cut at an orientation that is parallel to the axis of rotation 84 of the pinion member 32. The first set of wobble gear teeth 108 has a first number of wobble gear teeth, a first outer circumference, a first wobble gear tooth profile, and a first wobble gear tooth width. The second set of wobble gear teeth 110 has a second number of wobble gear teeth, a second outer circumference, a second wobble gear tooth profile, and a second wobble gear tooth width. It should be appreciated that the first outer circumference and the second outer circumference represent the outer most circumference as measured about the tips of the first and second sets of wobble gear teeth 108, 110. The first and second wobble gear tooth profiles refer to the shape (e.g. geometry or curvature) of the first and second sets of wobble gear teeth 108, 110. Finally, the first and second wobble gear tooth widths are measurable in a direction that is parallel to the axis of rotation 84 of the pinion member 32. The first and second sets of wobble gear teeth 108, 110 are distinguishable because at least one of the first number of wobble gear teeth, the first outer circumference, and the first wobble gear tooth profile is different from the second number of wobble gear teeth, the second outer circumference, and the second wobble gear tooth profile.

The wobble gear 28 includes an inner bore 112 that has a third bearing surface 114 that is circular in shape and that is concentrically arranged with respect to the first outer circumference of the first set of wobble gear teeth 108 and the second outer circumference of the second set of wobble gear teeth 110. The eccentric lobe 102 of the helical gear 26 extends into the inner bore 112 of the wobble gear 28 such that the wobble gear 28 is supported by and is rotatable relative to the eccentric lobe 102 of the helical gear 26. The eccentric lobe 102 of the helical gear 26 may optionally include a recessed surface 116. The recessed surface 116 has a limited circumferential extent meaning that the recessed surface 116 extends across less than 180 degrees of the eccentric lobe 102. The recessed surface 116 is spaced from and does not contact the wobble gear 28. This reduces the contact area between the eccentric lobe 102 of the helical gear 26 and the wobble gear 28 such that friction between the eccentric lobe 102 and the wobble gear 28 is reduced for improved efficiency. It should also be appreciated that the first and second set of wobble gear teeth 108, 110 are outwardly directed, extending radially away from the inner bore 112 of the wobble gear 28.

As best seen in FIGS. 4 and 6, a first ring gear 118 is disposed within the gear cavity 68 of the gear housing 42. The first ring gear 118 is arranged in meshing engagement with the first set of wobble gear teeth 108. The first ring gear 118 is fixed with the gear housing 42 such that the first ring gear 118 cannot rotate relative to the gear housing 42. The first ring gear 118 includes a first set of ring gear teeth 120. The first set of ring gear teeth 120 has a first number of ring gear teeth, a first inner circumference, a first ring gear tooth profile, and a first ring gear tooth width W1. It should be appreciated that the first inner circumference represents the inner most circumference as measured from the tips of the first set of ring gear teeth 120. The first ring gear tooth profile refers to the shape (e.g. geometry or curvature) of the first set of ring gear teeth 120. Finally, the first ring gear tooth width W1 is measurable in a direction that is parallel to the axis of rotation 84 of the pinion member 32. The first inner circumference of the first set of ring gear teeth 120 may be larger than the first outer circumference of the first set of wobble gear teeth 108 such that the wobble gear 28 moves in an orbital path within the first ring gear 118 when the helical gear 26 rotates. In operation, rotation of the helical gear 26 is opposite the rotation of the wobble gear 28. For example, where the helical gear 26 rotates in a clockwise direction, the wobble gear 28 will move counter-clockwise in the orbital path and where the helical gear 26 rotates in a counter-clockwise direction, the wobble gear 28 will move clockwise in the orbital path.

As best seen in FIG. 3, the pinion disc 30 that is carried on the pinion member 32 includes a splined bore 122. The first series of splines 90 of the splined portion 58 of the pinion member 32 extend through and are engaged with the splined bore 122 of the pinion disc 30 rotatably coupling the pinion disc 30 with the pinion member 32. In other words, the pinion disc 30 is locked in rotation with the pinion member 32. Notwithstanding this structural arrangement, it should be appreciated that a variety of other configurations are possible, including without limitation, configurations where the pinion disc 30 is integral with the pinion member 32 or where the pinion disc 30 is coupled to the pinion member 32 by fasteners, adhesive, or welding. In the example illustrated, the pinion disc 30 is made of a polymeric material.

The pinion disc 30 includes a gear pocket 124 that faces the helical gear 26 and the wobble gear 28. The pinion disc 30 also includes a cylindrical hub 126 opposite the gear pocket 124 that projects longitudinally outward away from the wobble gear 28. The gear pocket 124 of the pinion disc 30 includes an open end 128 and an opposing end 130 that is at least partially enclosed. A second ring gear 132 is disposed within the gear pocket 124 of the pinion disc 30. The second ring gear 132 is arranged in meshing engagement with the second set of wobble gear teeth 110. The second ring gear 132 is fixed with the pinion disc 30 such that the second ring gear 132 rotates with the pinion disc 30 relative to the gear housing 42.

The second ring gear 132 includes a second set of ring gear teeth 134. The second set of ring gear teeth 134 has a second number of ring gear teeth, a second inner circumference, a second ring gear tooth profile, and a second ring gear tooth width W2. It should be appreciated that the second inner circumference represents the inner most circumference as measured from the tips of the second set of ring gear teeth 134. The second ring gear 132 tooth profile refers to the shape (e.g. geometry or curvature) of the second set of ring gear teeth 134. Finally, the second ring gear tooth width W2 is measurable in a direction that is parallel to the axis of rotation 84 of the pinion member 32. The second inner circumference of the second set of ring gear teeth 134 may be larger than the second outer circumference of the second set of wobble gear teeth 110 such that the wobble gear 28 moves in the orbital path when the helical gear 26 rotates. At least one of the first number of ring gear teeth, the first inner circumference, and the first ring gear tooth profile is different from the second number of ring gear teeth, the second inner circumference, and the second ring gear tooth profile. Because the pinion member 32 and the pinion disc 30 are not fixed relative to the gear housing 42, rotation of the wobble gear 28 causes the pinion disc 30 and thus the pinion shaft to rotate. As is typical of ring gear structures, the first and second sets of ring gear teeth are inwardly directed, extending radially towards the pinion member 32 and the first and second sets of ring gear teeth 120, 134 have a spur gear arrangement where the first and second sets of ring gear teeth 120, 134 are cut in a direction that is parallel to the axis or rotation of the pinion member 32.

Figure 7:
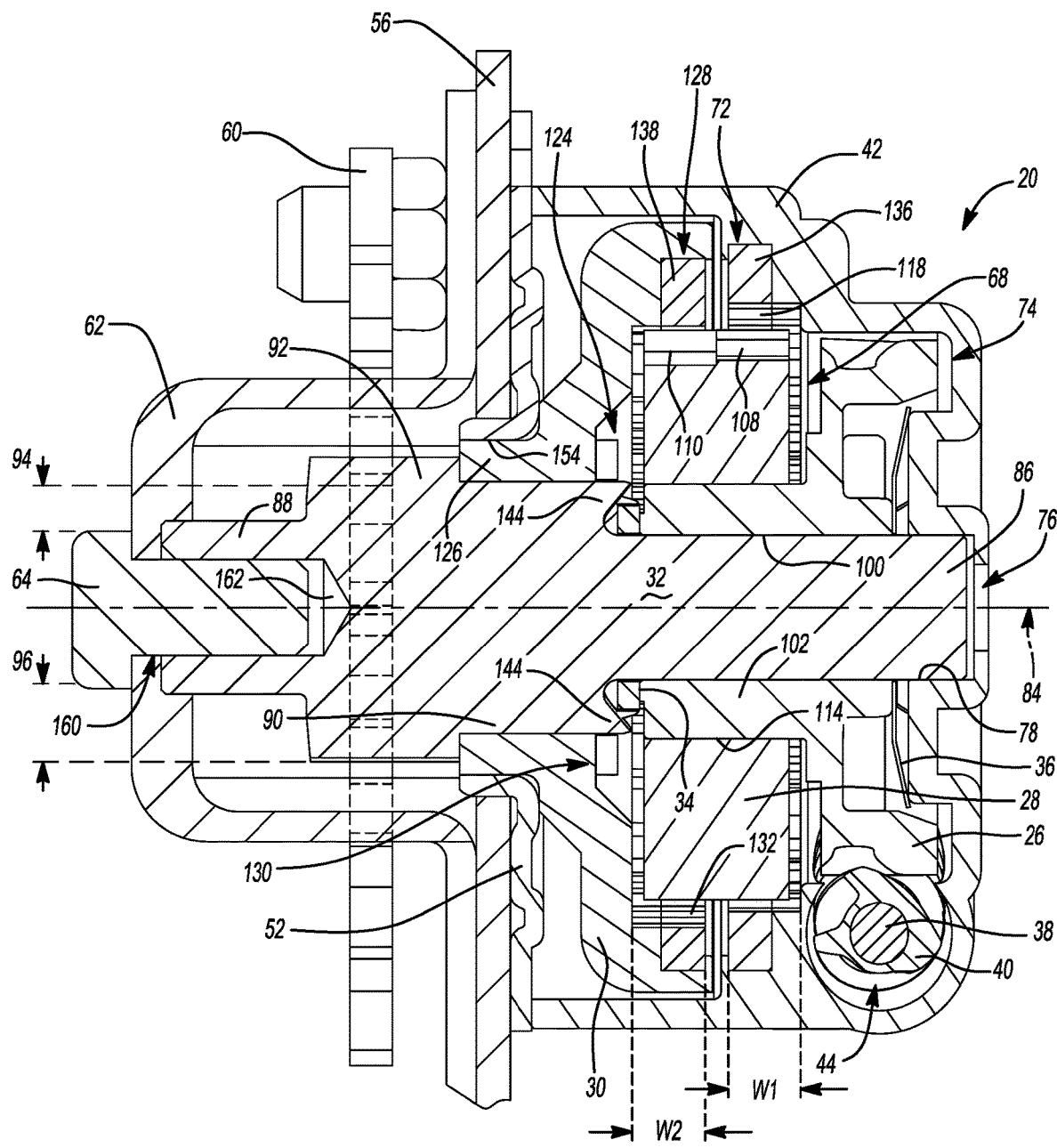
FIG. 7 is a side cross-sectional view of the exemplary gear assembly shown in FIG. 3 taken along line 7-7 in FIG. 3.

With reference to FIGS. 3, 6, and 7, at least part of the wobble gear 28 is disposed within the gear pocket 124 of the pinion disc 30. A housing side gear ring 136 is disposed within the gear cavity 68 of the gear housing 42 adjacent the open side 72 of the gear cavity 68. The housing side gear ring 136 is fixed to the gear housing 42 such that the housing side gear ring 136 cannot rotate within the gear housing 42. The housing side gear ring 136 defines a portion of the first ring gear 118. That is, part of the first ring gear tooth width W1 is defined by the housing side gear ring 136 and another part of the first ring gear tooth width W1 is defined by the gear housing 42. The housing side gear ring 136 is made of a material that is harder than the polymeric material of the gear housing 42. By way of example and without limitation, the housing side gear ring 136 may be made of a metallic material. As best seen in FIGS. 3 and 7, a pinion disc gear ring 138 is disposed within the gear pocket 124 of the pinion disc 30 adjacent the open end 128 of the gear pocket 124. The pinion disc gear ring 138 is fixed to the pinion disc 30 such that the pinion disc gear ring 138 is locked in rotation with the pinion disc 30. The pinion disc gear ring 138 defines a portion of the second ring gear 132. That is, part of the second ring gear tooth width W2 is defined by the pinion disc gear ring 138 and another part of the second ring gear tooth width W2 is defined by the pinion disc 30. The pinion disc gear ring 138 is made of a material that is harder than the polymeric material of the pinion disc 30. By way of example and without limitation, the pinion disc gear ring 138 may be made of a metallic material. It should be appreciated that the gear housing 42 and the pinion disc 30 may be made of the same material or different materials and that the housing side gear ring 136 and the pinion disc gear ring 138 may be made of the same material or different materials, but that the material of the gear housing 42 will always differ from the material of the housing side gear ring 136 and that the material of the pinion disc 30 will always differ from the material of the pinion disc gear ring 138.

It should be appreciated that the relative hardness of the housing side gear ring 136 and the gear housing 42 and the relative hardness of the pinion disc gear ring 138 and the pinion disc 30 may be determined using known methods. By way of example and without limitation, hardness tests such as the Rockwell Hardness Test may be employed to measure the relative hardness of the housing side gear ring 136 and the gear housing 42 and the relative hardness of the pinion disc gear ring 138 and the pinion disc 30. Advantageously, the softer material(s) of the gear housing 42 and the pinion disc 30 make the gear assembly 20 quieter during operation, reduce play between the first ring gear 118 and the first set of wobble gear teeth 108, and reduce play between the second ring gear 132 and the second set of wobble gear teeth 110. At the same time, the harder material(s) of the housing side gear ring 136 and the pinion disc gear ring 138 prevent damage, excessive wear, and deformation of the first and second set of ring gear teeth 120, 134 due to the torque the wobble gear 28 applies to the first and second ring gears 118, 132.

As best seen in FIGS. 3, 4, and 6, the housing side gear ring 136 and the pinion disc gear ring 138 each includes a plurality of protrusions 140 that are circumferentially spaced. The plurality of protrusions 140 of the housing side gear ring 136 and the pinion disc gear ring 138 extend radially outwardly into notches 142 disposed in the gear housing 42 and the pinion disc 30, respectively, such that the housing side gear ring 136 is locked in place within the gear housing 42 and such that the pinion disc gear ring 138 rotates together with the pinion disc 30. Although the housing side gear ring 136 and the pinion disc gear ring 138 may be made by a variety of different manufacturing processes, by way of non-limiting example, each of the housing side gear ring 136 and the pinion disc gear ring 138 may be made by a precision blanking process.

As best seen in FIGS. 3 and 7, the first series of splines 90 of the pinion member 32 extend longitudinally from the second series of splines 92 to a plurality of cupped spline ends 144. The cupped spline ends 144 extend longitudinally outward over the first shaft segment 86 of the pinion member 32 at an angle and are crimped against the disc retainer 34. It should be appreciated that crimping occurs when the cupped spline ends 144 press against the disc retainer 34 and bend outwardly as the pinion member 32 is moved longitudinally toward the gear housing 42 during installation of the gear assembly 20. The disc retainer 34 is carried on the first shaft segment 86 of the pinion member 32 and is disposed within the gear cavity 68 of the gear housing 42. The disc retainer 34 is positioned longitudinally between the wobble gear 28 and the pinion disc 30 and has a circular disc-like shape and a circular bore 146. The first shaft segment 86 of the pinion member 32 extends through the circular bore 146 in the disc retainer 34 and the disc retainer 34 secures the pinion disc 30 on the pinion member 32 and prevents the pinion disc 30 from moving longitudinally relative to the pinion member 32. The lock washer 36 is also carried on the first shaft segment 86 of the pinion member 32 and is disposed within the gear cavity 68 of the gear housing 42. The lock washer 36 is positioned longitudinally between the gear housing 42 and the helical gear 26. The lock washer 36 has a circular hole 148 and bent star-shaped fingers 150 that engage the gear housing 42. The first shaft segment 86 of the pinion member 32 extends through the circular hole 148 in the lock washer 36 and the lock washer 36 secures the helical gear 26 on the pinion member 32 by preventing the helical gear 26 from moving longitudinally relative to the pinion member 32. It should be appreciated that the star-shaped fingers 150 deflect and apply a longitudinal force to the helical gear 26 when the pinion member 32 is moved longitudinally toward the gear housing 42 during installation of the gear assembly 20.

Still referring to FIGS. 3 and 7, the gear housing bracket 52 includes a through-bore 152 defining a fourth bearing surface 154. The cylindrical hub 126 of the pinion disc 30 extends through the through-bore 152 of the gear housing bracket 52 with the fourth bearing surface 154 supporting the cylindrical hub 126 of the pinion disc 30 such that the pinion disc 30 is rotatable relative to the gear housing bracket 52. The gear housing bracket 52 also includes a plurality of gear housing mounting holes 156 that are spaced about the through-bore 152 and a plurality of seat adjuster mounting holes 158 that are spaced about the through-bore 152. The gear housing bracket 52 is attached to the gear housing 42 by fasteners 54*a* extending through the plurality of gear housing mounting holes 156 and the gear housing bracket 52 is attached to the frame 56 of the seat adjuster 22 by fasteners 54*b* extending through the plurality of seat adjuster mounting holes 158. Of course the gear housing bracket 52 may be attached to the gear housing 42 and/or the frame 56 of the seat adjuster 22 without fasteners 54*a*, 54*b*. For example and without limitation, the gear housing bracket 52 may be attached to the gear housing 42 and/or the frame 56 of the seat adjuster 22 by adhesive or by welding.

The sector gear 60 of the seat adjuster 22 has a wedge-like shape and can be thought of as a slice or portion of a larger circular gear. For example and without limitation, the sector gear 60 may have a limited radial extent of 45 degrees or less. The sector gear 60 is supported on the rear cross-member 59 of the seat adjuster 22. The sector gear 60 is meshingly engaged with the second series of splines 92 of the splined portion 58 of the pinion member 32. As such, rotation of the pinion member 32 in one rotational direction pivots the sector gear 60 in a downward direction, which drives the frame 56 of the seat adjuster 22 up to a raised seat position (FIG. 1). Rotation of the pinion member 32 in an opposite rotational direction pivots the sector gear 60 in an upward direction, which lowers the frame 56 of the seat adjuster 22 (FIG. 2). The crash bracket 62 of the seat adjuster 22 includes a circular opening 160 that receives and supports the second shaft segment 88 of the pinion member 32. The second shaft segment 88 of the pinion member 32 includes a threaded hole 162 (FIG. 7) that threadably receives the bolt 64. As previously noted, the bolt 64 supports the pinion member 32 while still permitting the pinion member 32 to rotate relative to the crash bracket 62 and the frame 56 of the seat adjuster 22.

It should also be appreciated that a key advantage of the gear assembly 20 disclosed herein is that the gear assembly 20 is self-locking and will not back drive from the raised position (FIG. 1) to the lowered position (FIG. 2), or vice versa for that matter. That is, any torque the frame 56 of the seat adjuster 22 applies to the sector gear 60 cannot force rotation of pinion member 32 because the wobble gear 28 will not move in the orbital path unless the helical gear 26 is first rotated. This is particularly important during crash events where movement of the frame 56 of the seat adjuster 22 is undesirable. The self-locking characteristic of the gear assembly 20 is also advantageous because the seat adjuster 22 will not back drive over time due to a combination of gravity and road vibration acting on the automotive seat assembly 10.

Figure 8:
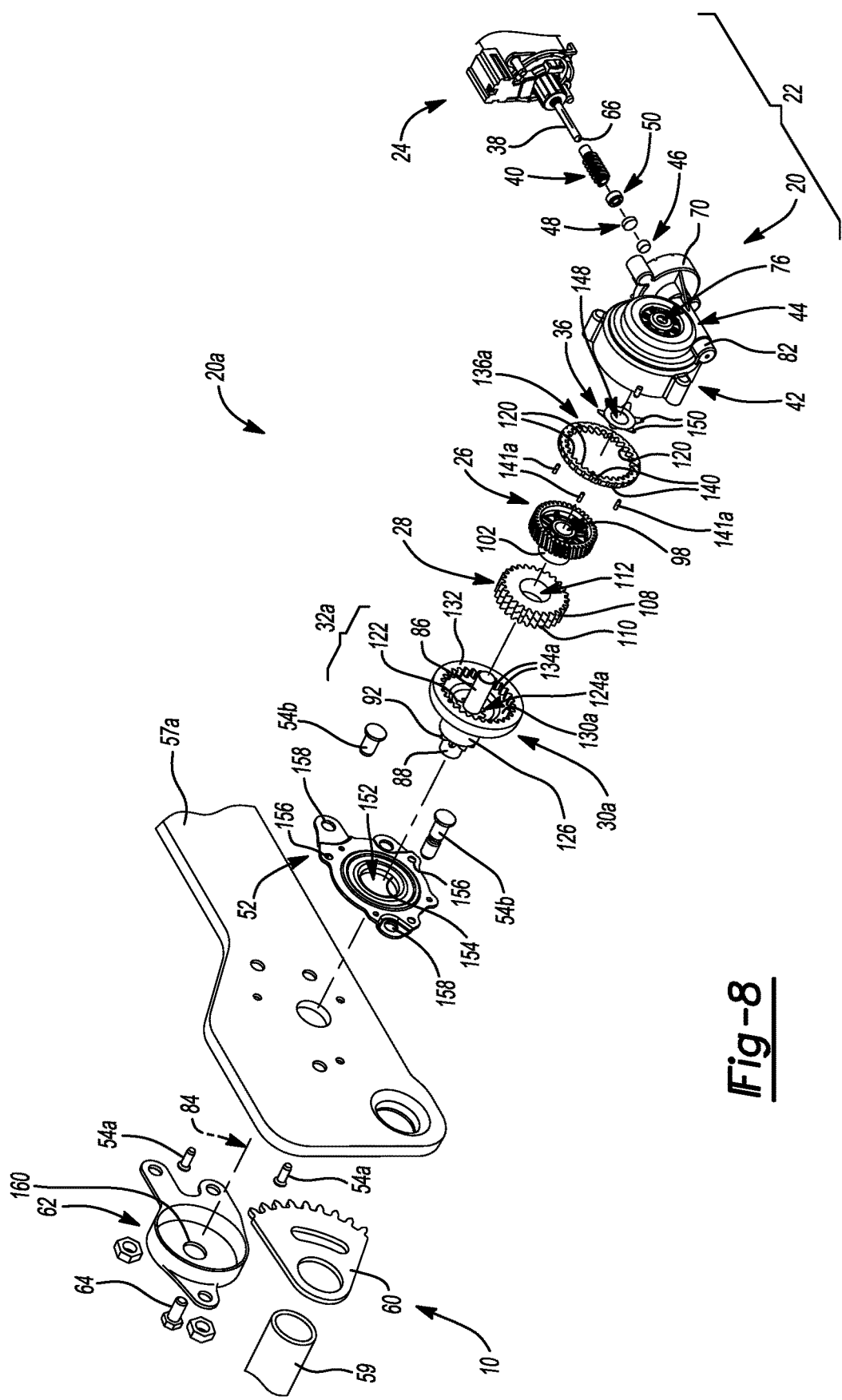
FIG. 8 is an exploded front perspective view of another exemplary gear seat adjuster, where the exemplary seat adjuster has been constructed in accordance with the subject disclosure and includes a gear assembly having a gear housing, an actuator, a pinion member, a helical gear, a wobble gear, and a pinion disc.
Figure 9:
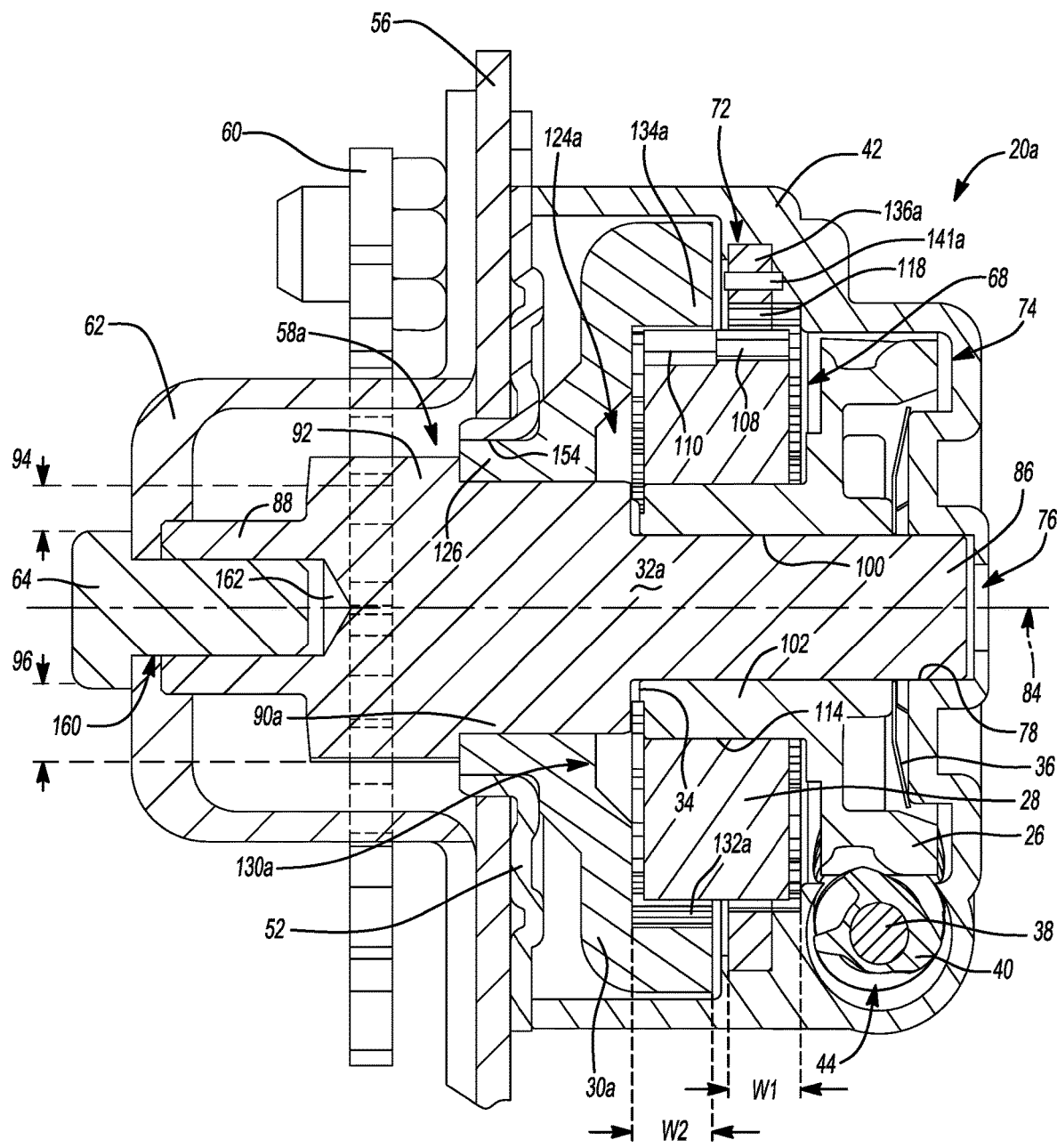
FIG. 9 is a side cross-sectional view of the exemplary gear assembly shown in FIG. 8 taken along line 9-9 in FIG. 8.

Referring to FIGS. 8 and 9, another gear assembly 20*a* is disclosed. The gear assembly 20*a* shown in FIGS. 8 and 9 shares many of the same components as the gear assembly 20 shown in FIGS. 1-7, where like numbers correspond to like parts throughout the views. The new or modified components shown in FIGS. 8 and 9 have the letter "a" following the reference number. For example, pinion disc 30a in FIGS. 8 and 9 corresponds to pinion disc 30 in FIGS. 1-7, but has some difference over the pinion disc 30 shown in FIGS. 1-7. The gear assembly 20a shown in FIGS. 8 and 9 lacks the disc retainer 34 and the pinion disc gear ring 138 of the gear assembly 20 shown in FIGS. 1-7. Instead, the pinion disc 30a of pinion member 32a in FIGS. 8 and 9 includes a second set of ring gear teeth 134a that define a second ring gear 132a, which is integrated into the pinion disc 30a. The second ring gear 132a extends circumferentially around a gear pocket 124a in the pinion disc 30a. Unlike the pinion disc 30 shown in FIGS. 1-7, which is made of a polymeric material, the pinion disc 30a shown in FIGS. 8 and 9 is made of a metallic material for added strength. The second set of ring gear teeth 134a have a second ring gear tooth width W2. In FIGS. 8 and 9, 100 percent of the second ring gear tooth width W2 is defined by the pinion disc 30a. The wobble gear 28 is partially received in the gear pocket 124a of the pinion disc 30a and the second set of wobble gear teeth 110 are arranged in meshing engagement with the second set of ring gear teeth 134a. The pinion member 32a includes a splined portion 58a with a first series of splines 90a that engage the splined bore 122 of the pinion disc 30a and a second series of splines 92 that engage the sector gear 60. As a result, the pinion disc 30a rotates with the first and second shaft segments 86, 88, and the splined portion 58a of the pinion member 32a.

As shown in FIG. 8, the pinion member 32a is pre-assembled with the pinion disc 30a. In other words, the pinion disc 30a, the first and second shaft segments 86, 88, and the splined portion 58a of the pinion member 32a form a single pre-assembled component of the gear assembly 20a. The pinion disc 30a, the first and second shaft segments 86, 88, and the splined portion 58a of the pinion member 32a are all made of metal. In one example, the pinion disc 30a is made by a precision blanking process, which is also known as fine blanking.

As shown in FIGS. 8 and 9, housing side gear ring 136a includes a plurality of protrusions 140 that are circumferentially spaced. The plurality of protrusions 140 of the housing side gear ring 136a extend radially outwardly into notches 142 disposed in the gear housing 42 such that the housing side gear ring 136a is locked in place within the gear housing 42. In addition, the gear assembly 20a includes pins 141a that extend through holes in the housing side gear ring 136a and into the gear housing 42. These pins 141a provide additional anchoring support to prevent the housing side gear ring 136a from shifting or spinning in the gear housing 42. As best seen in FIG. 9, the wobble gear 28 has a one-piece construction and includes a first set of wobble gear teeth 108 and a second set of wobble gear teeth 110. It should be appreciated that the wobble gear 28 can be made in a number of different ways. For example and without limitation, the wobble gear 28 can be made of powdered metal.

Figure 10:
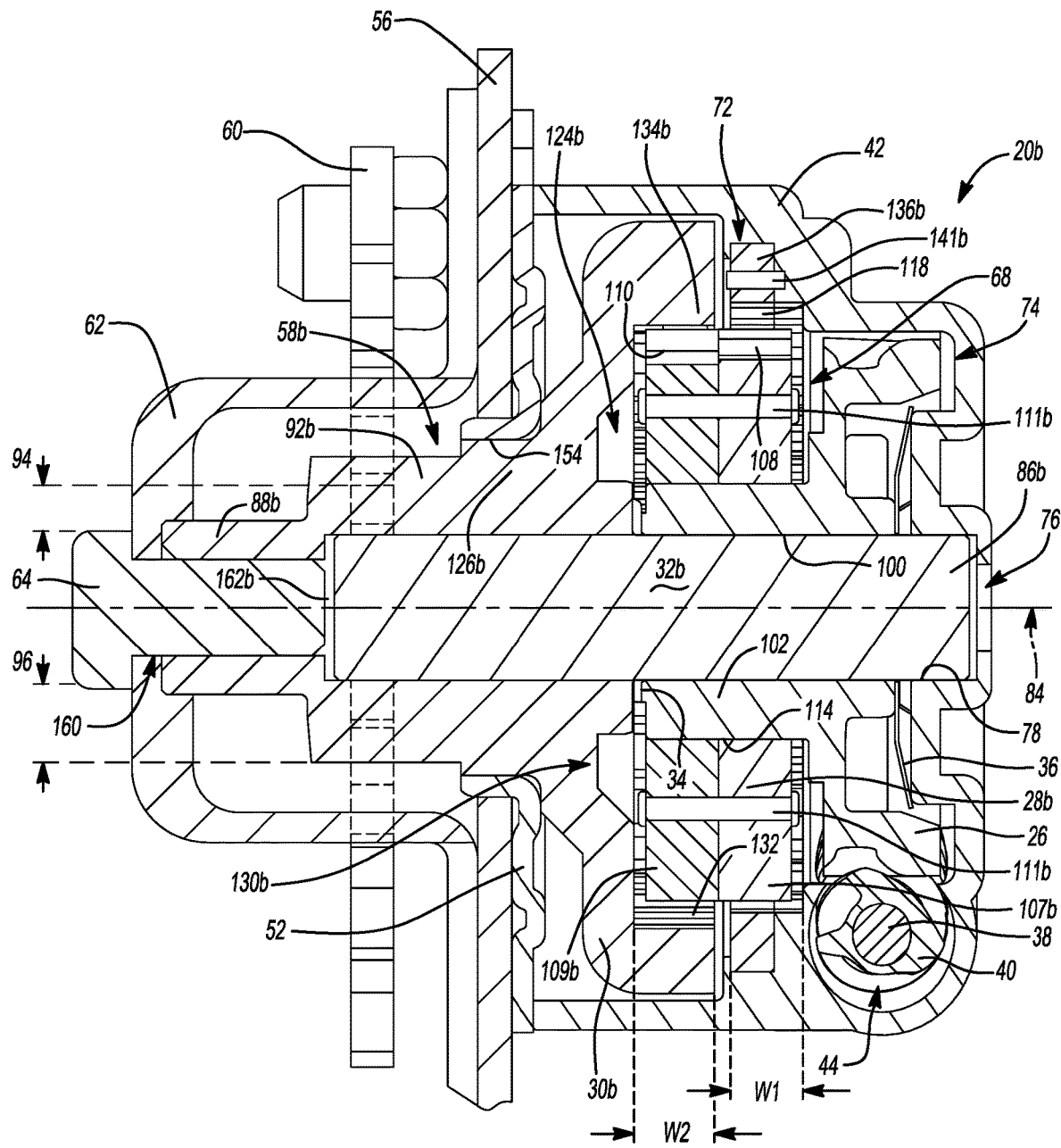
FIG. 10 is a side cross-sectional view of another exemplary gear assembly where the pinion member and pinion disc are integral as part of a one-piece component.

Referring to FIG. 10, another gear assembly 20b is disclosed. The gear assembly 20b shown in FIG. 10 shares many of the same components as the gear assembly 20 shown in FIGS. 1-7 and the gear assembly 20a shown in FIGS. 8 and 9, where like numbers correspond to like parts throughout the views. The new or modified components shown in FIG. 10 have the letter "b" following the reference number. For example, pinion disc 30b in FIGS. 8 and 9 corresponds to pinion disc 30 in FIGS. 1-7 and pinion disc 30a in FIGS. 8 and 9, but has some difference over the pinion disc 30 shown in FIGS. 1-7 and the pinion disc 30a shown in FIGS. 8 and 9. The gear assembly 20b shown in FIG. 10 lacks the disc retainer 34 and the pinion disc gear ring 138 of the gear assembly 20 shown in FIGS. 1-7. Instead, the pinion disc 30b of pinion member 32b in FIG. 10 includes a second set of ring gear teeth 134b that define a second ring gear 132b, which is integrated into the pinion disc 30b. The second ring gear 132b extends circumferentially around a gear pocket 124b in the pinion disc 30b. Like the pinion disc 30a shown in FIGS. 8 and 9, the pinion disc 30b shown in FIG. 10 is made of a metallic material for added strength. The second set of ring gear teeth 134b have a second ring gear tooth width W2. In FIG. 10, 100 percent of the second ring gear tooth width W2 is defined by the pinion disc 30b. The wobble gear 28 is partially received in the gear pocket 124b of the pinion disc 30b and the second set of wobble gear teeth 110 are arranged in meshing engagement with the second set of ring gear teeth 134b.

Unlike the splined portion 58a of the pinion member 32a shown in FIGS. 8 and 9, the pinion member 32b shown in FIG. 10 has a splined portion 58a with only one set of splines 92b. These splines 92b engage the sector gear 60. The pinion disc 30b in FIG. 10 is integral with the cylindrical hub 126b, the splined portion 58b, and second shaft segment 88b of the pinion member 32b, which form a one-piece component. A bore 162b extends longitudinally through the cylindrical hub 126b, the splined portion 58b, and second shaft segment 88b of the pinion member 32b. The pinion member 32b further includes a first shaft segment 86b, which is a separate component that extends into the bore 162b in a press fit. As a result, the pinion disc 30b rotates with the cylindrical hub 126b, the splined portion 58b, and the first and second shaft segments 86b, 88b of the pinion member 32b. By constructing the pinion member 32b in this way, the pinion disc 30b can be made of powdered metal or a metal forging for added strength.

As shown in FIG. 10, housing side gear ring 136b includes a plurality of protrusions 140 that are circumferentially spaced. The plurality of protrusions 140 of the housing side gear ring 136b extend radially outwardly into notches 142 disposed in the gear housing 42 such that the housing side gear ring 136b is locked in place within the gear housing 42. In addition, the gear assembly 20b includes pins 141b that extend through holes in the housing side gear ring 136b and into the gear housing 42. These pins 141b provide additional anchoring support to prevent the housing side gear ring 136b from shifting or spinning in the gear housing 42. In FIG. 9, wobble gear 28b has a two-piece construction and includes a first gear blank 107b and a second gear blank 109b. The first set of wobble gear teeth 108 are defined by the first gear blank 107b and the second set of wobble gear teeth 110 are defined by the second gear blank 109b. In the illustrated example, the first and second gear blanks 107b, 109b are connected by rivets 111b such that the first and second gear blanks 107b, 109b rotate together; however, it should be appreciated that other forms of connection are possible without departing from the scope of the subject disclosure. The first and second gear blanks 107b, 109b of the wobble gear 28b can be made in a number of different ways. For example and without limitation, the first and second gear blanks 107b, 109b of the wobble gear 28b can be made of metal by a precision blanking process. As compared to the powdered metal wobble gear 28 shown in FIGS. 1-9, manufacturing the wobble gear 28b shown in FIG. 10 by precision blanking can provide added strength and more precise tolerances.

Figure 11:
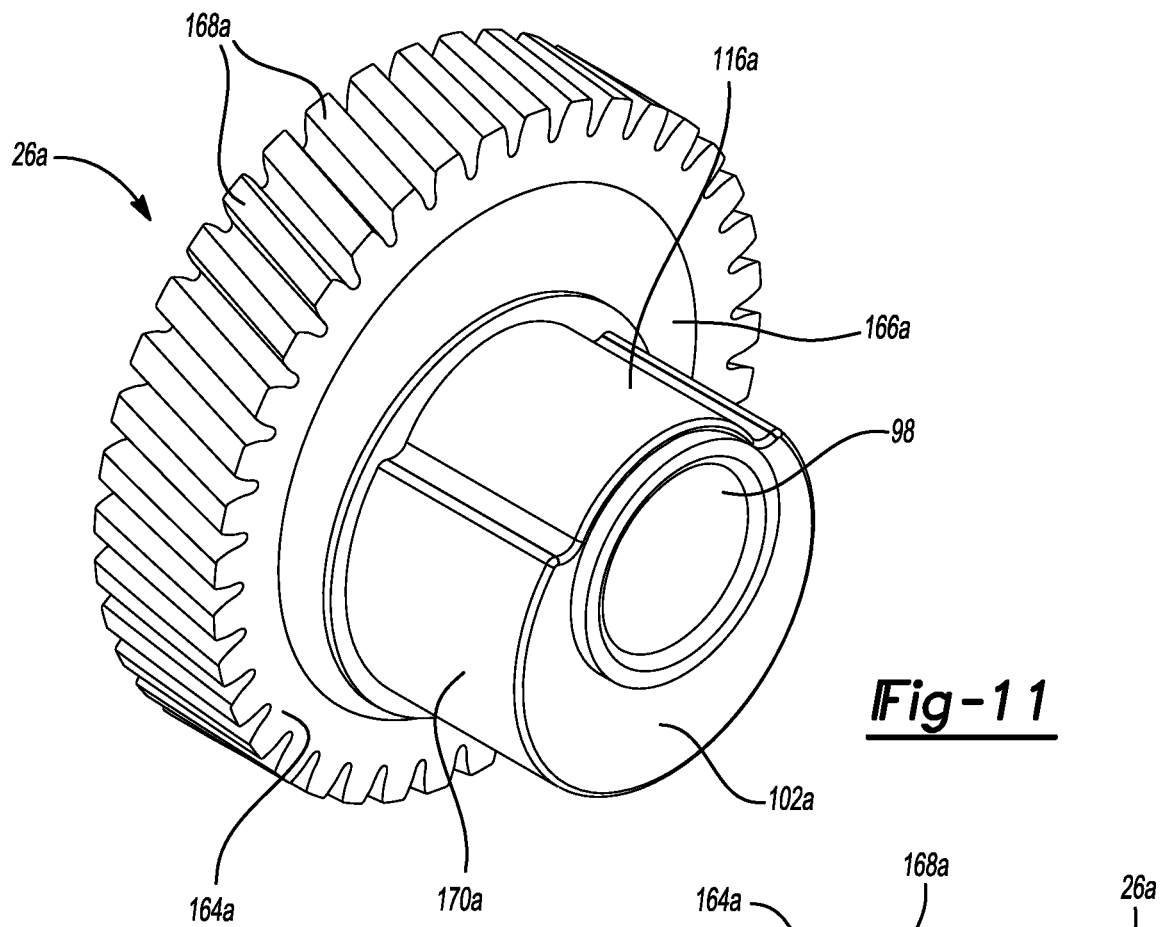
FIG. 11 is a front perspective view of an exemplary helical gear that is constructed in accordance with the subject disclosure.
Figure 12:
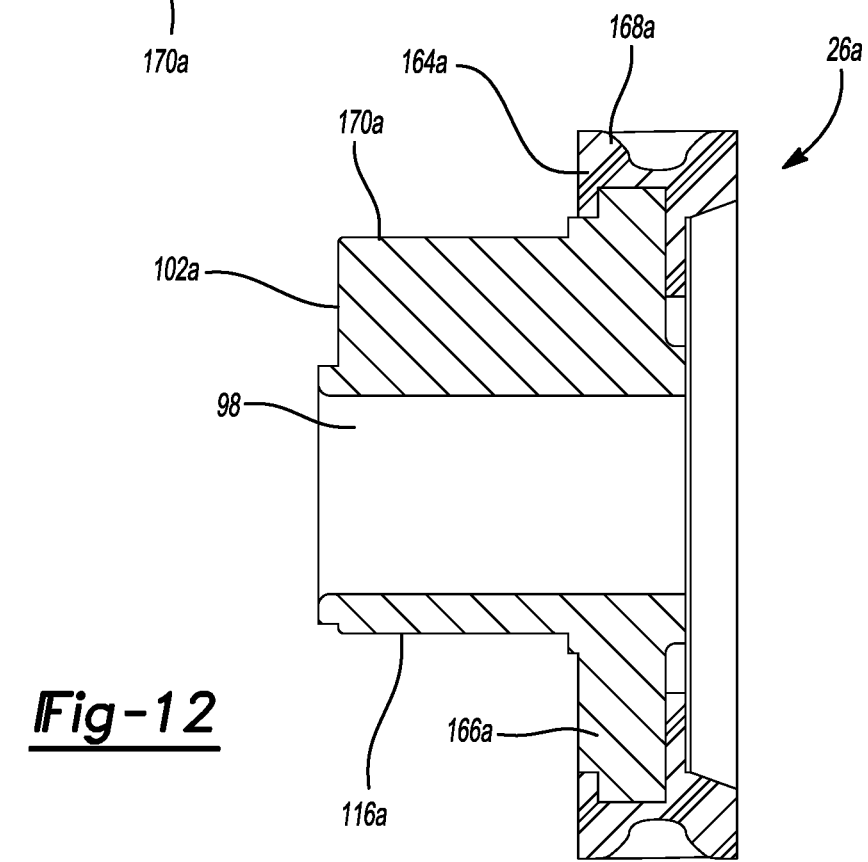
FIG. 12 is a side cross-sectional view of the exemplary helical gear shown in FIG. 11.

Referring to FIGS. 11 and 12, an alternative helical gear 26a is disclosed. The helical gear 26a shown in FIGS. 11 and 12 is similar to and is interchangeable with the helical gear 26 shown in FIGS. 1-7, where like numbers correspond to like parts throughout the views. The new or modified aspects of the helical gear 26a shown in FIGS. 11 and 12 have the letter "a" following the reference number. For example, eccentric lobe 102a in FIGS. 11 and 12 corresponds to eccentric lobe 102 in FIGS. 1-7, but has some difference over the eccentric lobe 102 shown in FIGS. 1-7. Unlike the helical gear 26 shown in FIGS. 1-7, which is a one-piece component made of a polymeric material, the helical gear 26a shown in FIGS. 11 and 12 includes an outer gear portion 164a that is made of a polymeric material and an inner portion 166a that is made of a metallic material. The helical gear 26a includes gear teeth 168a that are defined by the outer gear portion 164a. These gear teeth 168a meshingly engage the worm gear 40. Noise is reduced because the outer gear portion 164a is made of a polymeric material. The eccentric lobe 102a is defined by the inner portion 166a, which can be made of a sintered metal or a cast metal. The eccentric lobe 102a therefore has an outer surface 170a that is made of metal for improved wear resistance. As compared to the eccentric lobe 102 shown in FIGS. 1-7, the eccentric lobe 102a shown in FIGS. 11 and 12 has a recessed surface 116a that spans a larger circumferential extent of the outer surface 170a for reduced friction. It should be appreciated that the helical gear 26a shown in FIGS. 11 and 12 can be manufactured in a number of different ways. In one non-limiting example, the polymeric material forming the outer gear portion 164a is overmolded onto the inner portion 166a of the helical gear 26a.

Figure 13:
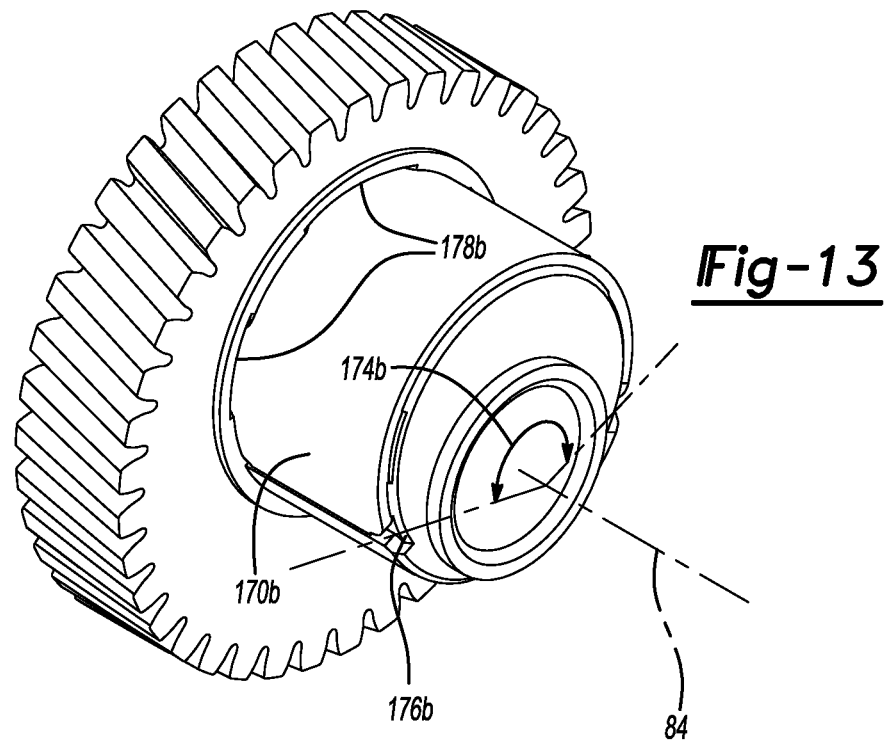
FIG. 13 is a front perspective view of another exemplary helical gear that is constructed in accordance with the subject disclosure.
Figure 14:
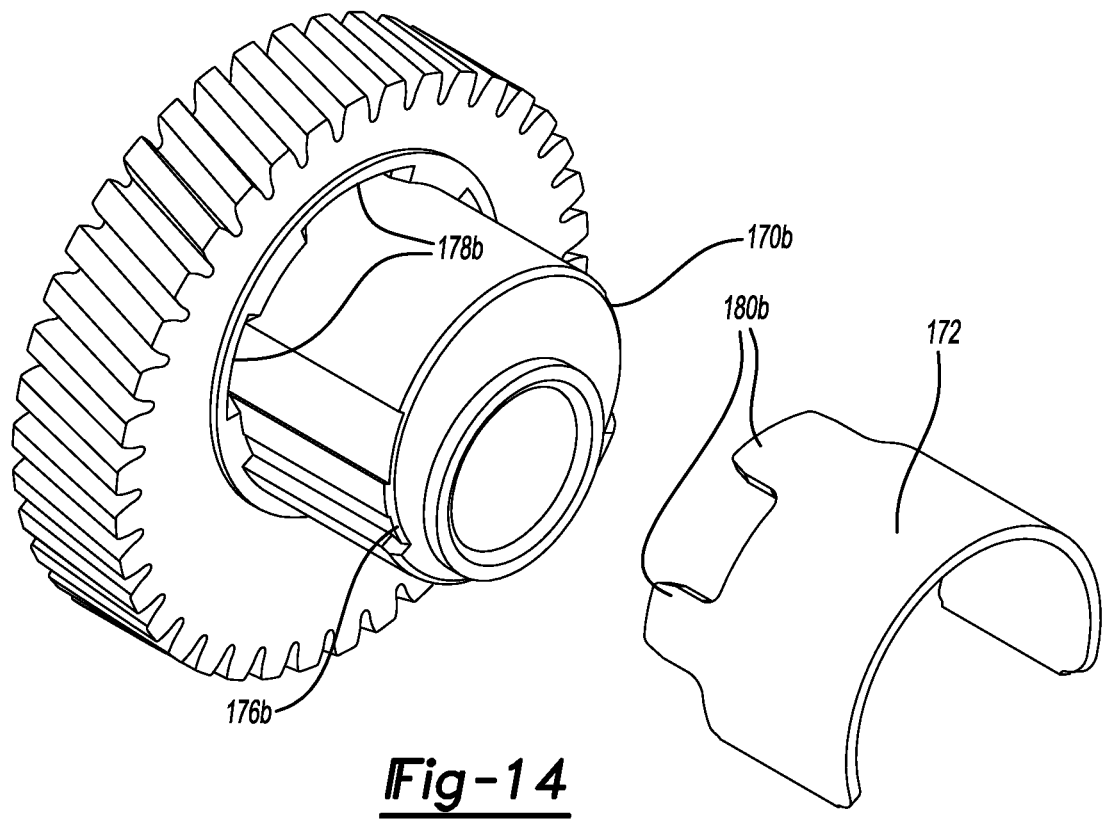
FIG. 14 is an exploded front perspective view of the exemplary helical gear shown in FIG. 13.

Referring to FIGS. 13 and 14, another alternative helical gear 26b is disclosed. The helical gear 26b shown in FIGS. 13 and 14 is similar to and is interchangeable with the helical gear 26 shown in FIGS. 1-7 and the helical gear 26a shown in FIGS. 11 and 12, where like numbers correspond to like parts throughout the views. The new or modified aspects of the helical gear 26b shown in FIGS. 13 and 14 have the letter "b" following the reference number. For example, eccentric lobe 102b in FIGS. 13 and 14 corresponds to eccentric lobe 102 in FIGS. 1-7 and eccentric lobe 102a in FIGS. 11 and 12, but has some difference over the eccentric lobe 102 shown in FIGS. 1-7 and the eccentric lobe 102a shown in FIGS. 11 and 12. Like the helical gear 26 shown in FIGS. 1-7, the helical gear 26b shown in FIGS. 13 and 14 is made of a polymeric material. However, the eccentric lobe 102b of the helical gear 26b shown in FIGS. 13 and 14 includes an outer surface 170b that is partially formed by a metal plate 172b, which extends circumferentially about part of the eccentric lobe 102b in an arc 174b. The length of the arc 174b (i.e., the arc length of the metal plate 172b) can vary based on design requirements. By way of example, the arc 174b may extend 150 degrees relative to the axis of rotation 84. The metal plate 172b is received in a channel 176b formed in the eccentric lobe 102b. The channel 176b has an arc length that is substantially the same as that of the metal plate 172b. Optionally, the helical gear 26b includes one or more slots 178b adjacent to the channel 176b and the metal plate 174b may include one of more tabs 180b that are received in the slots 178b to help retain the metal plate 174b in the channel 176b on the eccentric lobe 102b. Noise is reduced because the helical gear 26b is still made of a polymeric material; however, much of the outer surface 170b of the eccentric lobe 102b is formed by the metal plate 172b, which provides improved wear resistance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A gear assembly for a seat adjuster comprising:
    a worm gear disposed on a rotatable shaft;
    a gear housing including a gear cavity and a worm gear receptacle that opens into said gear cavity, said worm gear being disposed within said worm gear receptacle;
    a pinion member extending into said gear cavity of said gear housing and having a pinion disc, said pinion member being rotatable within said gear cavity and having an axis of rotation;
    a helical gear carried on said pinion member and disposed within said gear cavity of said gear housing, said helical gear arranged in meshing engagement with said worm gear;
    said helical gear including an eccentric lobe that projects longitudinally therefrom;
    a wobble gear carried on said eccentric lobe of said helical gear and disposed within said gear cavity of said gear housing, said wobble gear including a first set of wobble gear teeth and a second set of wobble gear teeth that are arranged in a side-by-side relationship;
    said first and second set of wobble gear teeth being rotatably coupled such that said first set of wobble gear teeth rotate with said second set of wobble gear teeth;
    a first ring gear disposed within said gear cavity of said gear housing that is meshingly engaged with said first set of wobble gear teeth, said first ring gear being fixed with said gear housing and said first ring gear including a first set of ring gear teeth having a first ring gear tooth width;
    said first ring gear being larger than said wobble gear such that said wobble gear moves in an orbital path within said first ring gear when said helical gear rotates;
    said pinion disc including a gear pocket that faces said helical gear and said wobble gear, said gear pocket including a second ring gear that is meshingly engaged with said second set of wobble gear teeth, said second ring gear being fixed with said pinion disc such that said second ring gear rotates with said pinion disc relative to said gear housing; and
    a housing side gear ring disposed within said gear cavity of said gear housing, said housing side gear ring being fixed to said gear housing and defining a portion of said first ring gear where part of said first ring gear tooth width is defined by said housing side gear ring and another part of said first ring gear tooth width is defined by said gear housing, said housing side gear ring being made of a material that is harder than said gear housing.

2. The gear assembly set forth in claim 1 wherein said gear housing is made of a polymeric material and wherein said housing side gear ring is made of a metallic material.

3. The gear assembly set forth in claim 2 wherein said wobble gear and said pinion disc are made of a metallic material.

4. The gear assembly set forth in claim 1 wherein said pinion member includes an first shaft segment, an second shaft segment, and a splined portion disposed between said first shaft segment and said second shaft segment, said first shaft segment of said pinion member extending through a hole in said gear housing such that said gear housing supports one side of said pinion member.

5. The gear assembly set forth in claim 4 wherein said splined portion includes a first series of splines extending circumferentially about said pinion member adjacent said first shaft segment and a second series of splines extending circumferentially about said pinion member adjacent said second shaft segment, said first series of splines having a first spline height and said second series of splines having a second spline height that is greater than said first spline height.

6. The gear assembly set forth in claim 5 wherein said pinion disc includes a splined bore and cylindrical hub opposite said gear pocket that projects longitudinally outward, said splined portion of said pinion member extending through said splined bore of said pinion disc such that said first series of splines mesh with said splined bore and rotatably couple said pinion disc with said pinion member.

7. The gear assembly set forth in claim 6 wherein said pinion disc is made of a metallic material by precision blanking.

8. The gear assembly set forth in claim 4 wherein said helical gear includes a central bore that is circular in shape and is co-axially arranged with said axis of rotation of said pinion member, said first shaft segment of said pinion member extending through said central bore of said helical gear such that said helical gear is supported by and is rotatable relative to said pinion member.

9. The gear assembly set forth in claim 4, further comprising:
a sector gear meshingly engaged with said splined portion of said pinion member.

10. The gear assembly set forth in claim 4, wherein said pinion disc, said second shaft segment, and said splined portion of said pinion member are integral and form a one-piece component.

11. The gear assembly set forth in claim 10, wherein a bore that extends through said second shaft segment and said splined portion of said pinion member and wherein said first shaft segment is a separate component that extends into said bore in said pinion member.

12. The gear assembly set forth in claim 10, wherein said pinion disc is made of powdered metal.

13. The gear assembly set forth in claim 10, wherein said pinion disc is made of a forged metal.

14. The gear assembly set forth in claim 1 wherein said wobble gear includes an inner bore that is circular in shape and is concentrically arranged in said wobble gear, said eccentric lobe having an axis of eccentricity that runs parallel to and is spaced from said axis of rotation of said pinion member, and said eccentric lobe of said helical gear extending into said inner bore of said wobble gear such that said wobble gear is supported by and is rotatable relative to said eccentric lobe of said helical gear.

15. The gear assembly set forth in claim 1 wherein said eccentric lobe of said helical gear includes a recessed surface having a limited circumferential extent that is spaced from said wobble gear to reduce friction between said eccentric lobe of said helical gear and said wobble gear.

16. The gear assembly set forth in claim 1 wherein said helical gear includes an outer gear portion that is made of a polymeric material and an inner portion defining said eccentric lobe that is made of a sintered or cast metal.

17. The gear assembly set forth in claim 1 wherein said helical gear is made of a polymeric material and wherein said eccentric lobe includes an outer surface that is partially formed by a metal plate that extends circumferentially about part of said eccentric lobe in an arc.

18. The gear assembly set forth in claim 1 wherein said housing side gear ring includes a plurality of protrusions that are circumferentially spaced and that extend radially outwardly into notches disposed in said gear housing such that said housing side gear ring is locked in place within said gear housing.

19. The gear assembly set forth in claim 1 wherein said housing side gear ring is made of a metallic material by precision blanking.

20. The gear assembly set forth in claim 1 wherein said gear cavity of said gear housing has an open side and an opposing side that is at least partially enclosed and said housing side gear ring is disposed within said gear cavity adjacent said open side.

* * * * *